(12) United States Patent
Oh et al.

(10) Patent No.: US 10,349,392 B2
(45) Date of Patent: Jul. 9, 2019

(54) METHOD AND APPARATUS FOR UPLINK CHANNEL ACCESSING WIRELESS COMMUNICATION SYSTEM

(71) Applicant: Samsung Electronics Co., Ltd., Gyeonggi-do (KR)

(72) Inventors: Jinyoung Oh, Seoul (KR); Jeongho Yeo, Gyeonggi-do (KR); Taehan Bae, Seoul (KR); Seunghoon Choi, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/448,218

(22) Filed: Mar. 2, 2017

(65) Prior Publication Data

US 2017/0257850 A1 Sep. 7, 2017

Related U.S. Application Data

(60) Provisional application No. 62/302,489, filed on Mar. 2, 2016, provisional application No. 62/373,521, filed on Aug. 11, 2016.

(51) Int. Cl.
*H04W 72/04* (2009.01)
*H04W 74/08* (2009.01)

(52) U.S. Cl.
CPC ....... *H04W 72/042* (2013.01); *H04W 74/085* (2013.01); *H04W 74/0808* (2013.01); *H04W 74/0816* (2013.01)

(58) Field of Classification Search
CPC ........... H04W 72/042; H04W 74/0816; H04W 74/085
See application file for complete search history.

(56) References Cited

U.S. PATENT DOCUMENTS

2013/0051358 A1 2/2013 Turtinen et al.
2013/0294356 A1 11/2013 Bala et al.
(Continued)

FOREIGN PATENT DOCUMENTS

KR 1020160013506 2/2016
WO WO 2015/179826 11/2015

OTHER PUBLICATIONS

International Search Report dated May 23, 2017 issued in counterpart application No. PCT/KR2017/002263, 3 pages.
(Continued)

*Primary Examiner* — Asad M Nawaz
*Assistant Examiner* — Zhaohui Yang
(74) *Attorney, Agent, or Firm* — The Farrell Law Firm, P.C.

(57) ABSTRACT

A communication technique for fusing 5G communication, which supports a higher data transmission rate than a 4G system, with an IoT technology is provided, and may be applied to an intelligent service (e.g., a smart home, a smart building, a smart city, a smart car, or a connected car, a health care application, a digital education application, a retail business application, a security and a safety related services, or the like) based on the 5G communication technology and the IoT related technology. Accordingly, a method for transmitting an uplink signal by a user equipment (UE) is provided and includes receiving, from a base station, information on a channel sensing type (LBT type), sensing a channel for an unlicensed band based on the information on the channel sensing type, and transmitting, to the base station, the uplink signal in the unlicensed band after sensing of the channel for the unlicensed band.

11 Claims, 11 Drawing Sheets

(56) References Cited

U.S. PATENT DOCUMENTS

2015/0163805 A1   6/2015  Cattoni et al.
2017/0086213 A1   3/2017  Kalhan
2018/0077581 A1*  3/2018  Ahn ..................... H04W 16/14
2018/0302868 A1* 10/2018  Bhorkar ............ H04W 56/0005

OTHER PUBLICATIONS

ZTE, "UL Framework for LAA", R1-156994, 3GPP TSG RAN WG1 Meeting #83, Nov. 15-22, 2015, 6 pages.
3rd Generation Partnership Project; Technical Specification Group Radio Access Network; Study on Licensed-Assisted Access to Unlicensed Spectrum; (Release 13), 3GPP TR 36.889 V13.0.0, Jun. 2015, 87 pages.
European Search Report dated Dec. 17, 2018 issued in counterpart application No. 17760315.6-1215, 7 pages.

* cited by examiner

METHOD AND APPARATUS FOR UPLINK CHANNEL ACCESSING WIRELESS COMMUNICATION SYSTEM

PRIORITY

This application claims priority under 35 U.S.C. § 119(e) to U.S. Provisional Application Ser. No. 62/302,489, which was filed on Mar. 2, 2016, and to U.S. Provisional Application Ser. No. 62/373,521, which was filed on Aug. 11, 2016, the entire disclosure of each of these applications is incorporated herein by reference.

BACKGROUND

1. Field of the Disclosure

The present disclosure relates to a channel sensing method, and more particularly, to a channel access method including a channel sensing operation and a channel occupation operation that are performed by a transmitting node or a receiving node for uplink signal transmission in a wireless communication system using an unlicensed band.

2. Description of the Related Art

To meet a demand for radio data traffic that is on an increasing trend since commercialization of a 4G communication system, efforts to develop an improved 5G communication system or a pre-5G communication system have been conducted. For this reason, 5G communication systems or the pre-5G communication systems can be called a beyond 4G network communication system or a post LTE system.

To achieve a high data transmission rate, the 5G communication system is considered to be implemented in a super high frequency (mmWave) band (e.g., a 60 GHz band). To relieve a path loss of a radio wave and increase a transfer distance of a radio wave in the super high frequency band, in the 5G communication system, technologies such as beamforming, massive multi-input multi-output (MIMO), full dimensional MIMO (FD-MIMO), an array antenna, analog beam-forming, and a large scale antenna have been used. Further, to improve a network of the system, in the 5G communication system, technologies such as an evolved small cell, an advanced small cell, a cloud radio access network (RAN), an ultra-dense network, a device to device communication (D2D), a wireless backhaul, a moving network, cooperative communication, coordinated multi-points (CoMP), and interference cancellation have been developed. In addition, in the 5G system, hybrid frequency shift keying (FSK) and quadrature amplitude modulation (QAM) modulation (FQAM) and sliding window superposition coding (SWSC), which are an advanced coding modulation (ACM) scheme and a filter bank multi carrier (FBMC), a non orthogonal multiple access (NOMA), and a sparse code multiple access (SCMA) that are an advanced access technology, and so on have been developed.

Meanwhile, the Internet has evolved from in a human-centered connection network through which a human being generates and consumes information to an internet of things (IoT) network that transmits and receives information between distributed components such as things and processes the information. The internet of everything (IoE) technology in which the big data processing technology is combined with the IoT technology by connection with a cloud server has also emerged. To implement the IoT, technology elements, such as a sensing technology, wired and wireless communication and network infrastructure, a service interface technology, and a security technology, have been required. Recently, technologies such as a sensor network, machine to machine (M2M), and machine type communication (MTC) for connecting between things has been researched. In the IoT environment, an intelligent internet technology (IT) service that creates a new value in human life by collecting and analyzing data generated in the connected things may be provided. The IoT may be applied to fields, such as a smart home, a smart building, a smart city, a smart car or a connected car, a smart grid, health care, smart appliances, and an advanced healthcare service, by fusing and combining the existing information technology with various industries.

Therefore, various attempts to apply the 5G communication system to the IoT network have been conducted. For example, the 5G communication technologies, such as the sensor network, the M2M, and the MTC, have been implemented by techniques such as beamforming, MIMO, and the array antenna. An example of the application of the cloud radio access network (cloud RAN) as the big data processing technology described above may also be the fusing of 5G technology with the IoT technology.

To meet a demand for wireless data traffic, discussions are underway to develop communication methods in various fields. For example, there are user equipment (UE) to UE communication, a frequency integration system for operating a plurality of cells, and a multi-antenna system using a large-scale antenna, or the like.

In recent years, a wireless communication system has been developed as a high-speed and high-quality wireless packet data communication system to provide a data service and a multimedia service in addition to provision of early voice-oriented service. In order to support the high-speed and high quality wireless packet data transmission service, various wireless communication standards such as high speed downlink packet access (HSDPA), high speed uplink packet access (HSUPA), long term evolution (LTE), long term evolution advanced (LTE-A) of 3rd generation partnership project (3GPP), high rate packet data (HRPD) of 3GPP2, and 802.16 of Institute of Electrical and Electronics Engineers (IEEE) have been developed. In particular, the LTE/LTE-A (LTE) has been continuously developed and progressed to improve system throughput and frequency efficiency. Typically, in the case of the LTE system, data transmission rate and system throughput may be significantly increased by using a frequency integration technology (carrier aggregation, (CA)) capable of operating the system using a plurality of frequency spectra. However, the frequency spectrum in which the LTE system currently operates is a licensed band or licensed carrier that an operator may use with its own authority. When a frequency spectrum (e.g., 5 GHz or less) in which the wireless communication service is typically provided, since it is already occupied and used by other operators or other communication systems, it may be difficult for the operator to secure a plurality of licensed band frequencies. Therefore, it is difficult to increase the system throughput using the CA technology. Accordingly, in order to process increasing mobile data in a situation in which it is hard to secure the licensed band frequency as described above, recently, a technology for utilizing the LTE system in an unlicensed band or unlicensed carrier has been researched (e.g., LTE in unlicensed (LTE-U) and licensed-assisted access (LAA)). Among the unlicensed spectra, particularly, 5 GHz spectrum is used by the relatively smaller number of communication devices as compared to 2.4 GHz unlicensed band, and may utilize significantly wide bandwidth, thus it is relatively easy to secure additional frequency spectrum. In other words, the licensed band frequency and the unlicensed band frequency may be utilized by using the LTE technology aggregating and using a plurality of frequency spectra, that is, the CA technology. In other words, an LTE cell in a licensed band may be set as PCell (or Pcell), an LTE in an unlicensed band (LAA cell or LTE-U cell) may be set as SCell (or Scell), such that the LTE system may be operated in the licensed band and the unlicensed band using the existing CA technology. The system may also be applied to a dual-connectivity environment, in which the licensed band and the unlicensed band are connected by a non-ideal backhaul, as well as the CA, in which the licensed band and the unlicensed band are connected by an ideal backhaul. However, in the present disclosure, the description will be made under the assumption of the CA environment in which the licensed band and the unlicensed band are connected by an ideal backhaul.

Generally, the LTE/LTE-A system is a method of transmitting data by using an orthogonal frequency division multiple access (OFDM) transmission scheme. In the OFDM scheme, a modulation signal is positioned at a two-dimensional resource configured of a time and a frequency. Resources on a time-axis are distinguished from each other by different OFDM symbols, and are orthogonal to each other. Resources on a frequency-axis are distinguished from each other by different sub-carriers, and are also orthogonal to each other. That is, in the OFDM scheme, when a specific OFDM symbol on the time-axis is designated and a specific sub-carrier on the frequency-axis is designated, one minimum unit resource may be indicated. The indicated minimum unit resource can be referred to as a resource element (RE). Different REs are orthogonal to each other even after passing through a frequency selective channel, therefore signals transmitted through different REs may be received by a reception side without causing interference with each other. In the OFDM communication system, a downlink bandwidth includes a plurality of resource blocks (RB), and each physical resource block (PRB) may include 12 sub-carriers arranged along the frequency-axis and 14 or 12 OFDM symbols arranged along the time-axis. Here, the PRB can be a basic unit for resource allocation.

A reference signal (RS) that is received from a base station, is a signal allowing a terminal to estimate a channel. In an LTE communication system, a demodulation reference signal (DMRS) can be included as one of a common reference signal (CRS) and an exclusive reference signal. A CRS that is a reference signal transmitted across entire downlink bandwidth, may be received by all terminals, and can be used in channel estimation, feedback information configuration of the terminal, or demodulation of a control channel and a data channel. A DMRS that is also a reference signal transmitted across entire downlink bandwidth, can be used in data channel modulation and channel estimation of a specific terminal, but is not used in feedback information configuration, unlike the CRS. Therefore, The DMRS can be transmitted through the PRB resource to be scheduled by the terminal.

On the time-axis, a subframe includes two slots, a first slot and a second slot, each having a length of 0.5 msec. A physical dedicated control channel (PDCCH) region that is a control channel region and an enhanced PDCCH (ePDCCH) region that is a data channel region are divided on the time-axis and then transmitted. This is to rapidly receive and demodulate the control channel signal. In addition, the PDCCH region is positioned across the entire downlink spectrum and has a form in which one control channel is divided into small units of control channels to be dispersed in the entire downlink spectrum. An uplink is largely divided into a control channel (PUCCH) and a data channel (PUSCH), and a response channel for the downlink data channel and other feedback information are transmitted through the control channel when the data channel is not present, and are transmitted through the data channel when the data channel is present.

FIGS. 1A and 1B are diagrams illustrating a conventional communication system to which the present disclosure can be applied.

Referring to FIGS. 1A and 1B, FIG. 1A illustrates a case in which an LTE cell 102 and an LAA cell 103 coexist in one small base station 101 in a network, and a terminal 104 performs transmission and reception of data with the base station 101 through the LTE cell 102 and the LAA cell 103. Schemes other than a duplex scheme of the LTE cell 102 or the LAA cell 103 can also be used. A cell performing data transmission and data reception by using a licensed band may be assumed as the LTE cell 102 or PCell, and a cell performing data transmission and data reception by using an unlicensed band may be assumed as the LAA cell 103 or SCell. However, when the LTE cell is PCell, uplink transmission may be performed only through the LTE cell 102.

FIG. 1B illustrates a case in which an LTE macro base station 111 for achieving wide coverage in the network and an LAA small base station 112 for increasing data transmission amount are installed; schemes other than a duplex scheme of the LTE macro base station 111 or the LAA small base station may also be used. In this case, the LTE macro base station 111 may also be replaced by an LTE small base station. Further, when the LTE base station is PCell, uplink transmission may be performed only through the LTE base station 111. The LTE base station 111 and the LAA base station 112 can be assumed to have an ideal backhaul network. Accordingly, fast X2 communication (or interface) 113 between the base stations is possible, such that even when the uplink transmission is performed only through the LTE base station 111, the LAA base station 112 may receive relevant control information from the LTE base station 111 through the X2 communication 113 in real time. Methods in accordance with the present disclosure may be applied to both of the systems in FIG. 1A and FIG. 1B.

In general, the unlicensed band is used in a manner that a plurality of devices share the same frequency spectrum or channel. The devices using the unlicensed band may be systems different from each other. Therefore, general operation of the devices operated in the unlicensed band for coexistence of various devices is as follows.

A transmitting device requiring transmission of a signal including a data signal, a control signal, or the like, confirms, with respect to the unlicensed band or a channel in which the signal transmission is performed, channel occupancy state of other devices before performing the signal transmission, and may occupy the channel depending on the determined channel occupancy state. The operation as described above is generally called listen-before-talk (LBT). In other words, the transmitting device needs to determine whether the transmitting device may occupy the channel according to a predefined or preset method. A method for sensing the channel may be defined or set in advance. Further, the time for sensing the channel may be defined or set in advance or randomly selected within a specific range. Moreover, the channel sensing time may be set in proportion to a set maximum channel occupancy time. A channel sensing operation for determining whether the channel may be occupied as described above may be set to be different depending on an unlicensed frequency spectrum in which the operation is performed, or regional and national regulation. For example, currently, in the United States, the unlicensed band may be used without a separate channel sensing operation except an operation for radar sensing in a frequency spectrum of 5 GHz.

The transmitting devices to use the unlicensed band may sense whether other devices use the corresponding channel through the foregoing channel sensing operation (or LBT) as described above, and use the channel by occupying the channel when it is sensed that the channel is not occupied by other devices in the channel. The devices using the unlicensed band may operate by defining or setting a maximum channel occupancy time for which the devices may continuously occupy a channel after the channel sensing operation, in advance. The maximum channel occupancy time may be defined in advance according to regulation defined in accordance with a frequency spectrum, a region, or the like, or may be separately set by a base station in a case of other devices, e.g., a terminal. The channel occupancy time may be set to be different depending on an unlicensed band or regional and national regulations. For example, in Japan, the maximum channel occupancy time is set to 4 ms in the unlicensed band of 5 GHz. Meanwhile, in Europe, the continuous channel occupancy time may be set to 10 ms or 13 ms. The devices occupying the channel for the maximum channel occupancy time may perform the channel sensing operation again, and then reoccupy the channel according to the channel sensing result.

The channel sensing operation and the channel occupation operation in the unlicensed band as described above will be described below with reference to FIG. 2, which illustrates a downlink transmission process of transmitting, by the base station, data or control signal to the terminal as an example, and the process may also be applied to uplink transmission in which the terminal transmits a signal to the base station.

An LTE subframe 200 in FIG. 2 is a subframe having a length of 1 ms, and may be configured of a plurality of OFDM symbols. The base station and the terminal capable of performing communication using an unlicensed band may perform communication by occupying a corresponding channel during a set channel occupancy time 250 and 260. When the base station occupying the channel for the set channel occupancy time 250 needs to additionally occupy the channel, the base station may perform the channel sensing operation 220, and then may reoccupy and use the channel depending on a result of the channel sensing operation. The required channel sensing period (or length) may be defined between the base station and the terminal in advance, set through a higher layer signal transmitted by the base station for the terminal, or set to be different according to a transmission/reception result of data transmitted through the unlicensed band.

Further, at least one of variables applied to the channel sensing operation that is performed again as described above may be set to be different from those of the previous channel sensing operation.

The operation for sensing and occupying a channel may be set to be different depending on the unlicensed band or regional and national regulations. The operation for sensing and occupying a channel with respect to a load-based equipment, which is one of channel access methods in EN301 893, a rule for 5 GHz spectrum of Europe, will be described in more detail below.

When the base station needs to additionally use the channel after the maximum channel occupancy time 250, it is required to determine whether other devices occupy the channel during a minimum channel sensing period 220. The minimum channel sensing period 220 may be set with a, depending on the maximum channel occupancy period, maximum channel occupancy period of $13/32 \times q$, (q=4, . . . , 32) and a minimum channel sensing period of length of extended clear channel assessment (ECCA) slot x rand (1, q).

Here, the length of the ECCA slot is a predefined or preset minimum unit (or length) of the channel sensing period. That is, when q is set to 32, the transmitting device may occupy the unlicensed band for up to 13 ms. A minimum channel sensing period, a random value from 1 to q (that is, 1 to 32), may be selected, and a total channel sensing period may be the length of the ECCA slot x of the selected random value. Therefore, when the maximum channel occupancy period is increased, the minimum channel sensing period can also be increased. The method for setting the maximum channel occupancy period and the minimum channel sensing period is merely an example, may be applied differently depending on the frequency spectrum, and the defined regional and national regulations, and may be changed depending on frequency regulation amendments still to be determined. Further, an additional operation (e.g., introduction of additional channel sensing period) in addition to the channel sensing operation according to the frequency regulation may also be included.

When other devices using the corresponding unlicensed band is not sensed by the base station in the channel sensing period 220, that is, when the channel is determined to be in an idle state, the base station may immediately occupy and use the channel. The determination on whether other devices occupy the channel in the channel sensing period 220 may be performed using a predefined or preset reference value. For example, when intensity of a signal received from other devices during the channel sensing period is greater than a predetermined reference value (e.g., −62 dBm), it may be determined that the channel is occupied by other devices. When the intensity of the received signal is smaller than a reference value, the channel may be determined to be in the idle state. The method for determining whether the channel is occupied may include various methods such as the foregoing method using the size of the reception signal, a method of detecting a signal defined in advance, or the like.

Since a general LTE operation is performed in a subframe unit, the signal may not be transmitted or received in the specific OFDM symbol immediately after performing the channel sensing operation (e.g., a signal transmission and reception operation is performed from a first OFDM symbol of the subframe). Therefore, the base station sensing the idle channel in the channel sensing period 220 in the subframe as described above may transmit a specific signal 230 for channel occupancy from the point in time when the channel sensing period 220 ends to immediately before first OFDM symbol transmission of a next subframe, i.e., during a period 230. In other words, the base station may transmit a second signal (e.g., primary synchronization signal (PSS)/secondary synchronization signal (SSS)/cell-specific reference signal (CRS), a newly defined signal, etc.) for channel occupancy with respect to corresponding unlicensed band, synchronization of the terminal, etc., before transmitting a first signal (e.g., general ePDCCH and PDSCH) transmitted in the subframe 210 or 240. The transmitted second signal may not be transmitted depending on the channel sensing period ending point in time. Further, when a corresponding channel occupancy starting point in time is set within the specific OFDM symbol, a third signal (a newly defined signal) is transmitted to a next OFDM symbol starting point in time, and the second signal or the first signal may be transmitted. In the present disclosure, the channel sensing operation period is described using an OFDM symbol unit, but the channel sensing operation period may be set regardless of the OFDM symbol of the LTE system.

Here, the PSS/SSS currently used in the LTE system may be reused as the second signal, or the second signal may be generated using at least one of the PSS and the SSS by using root sequence currently used in the licensed band and other sequence. Further, the second signal may be generated using other sequences except the PSS/SSS sequence required to generate a physical cell ID (PCID) of the base station in the unlicensed band to be used without being confused with the physical cell ID of the base station. Further, the second signal includes at least one of CRS and CSI-RS currently used in the LTE system, or ePDCCH, PDSCH, or a signal having modified form of ePDCCH and PDSCH may be used as the second signal.

Since the period 230 in which the second signal is transmitted is included in the channel occupancy time, frequency efficiency may be maximized by allowing minimum information to be transmitted through the second signal transmitted in the period 230.

The LTE system (LAA or LAA cell) using the unlicensed band as described above requires a new channel access (or LBT) scheme that is different from the existing method of using the licensed band, in order to satisfy regulations on the unlicensed band to be used and coexist with other systems (wireless-fidelity (WiFi)) using the unlicensed band.

Referring to FIG. 3, the channel access scheme for using the unlicensed band of the WiFi system is now described.

When a WiFi AP1 310 has data to be transmitted to station 1 (STA1) or a terminal 1 315, a channel sensing operation for a corresponding channel can be performed to occupy the channel. Generally the channel is sensed during distributed coordination function (DCF) interframe space (DIFS) time 330. Whether the channel is occupied by other devices may be determined by various methods, e.g., using intensity of the signal received during the time 330, a method of detecting a signal defined in advance, or the like. When it is determined that the channel is occupied by another device 320 during the channel sensing time 330, the AP1 310 selects a random variable 355, e.g., N in a set contention window (e.g., 1-16). Generally, such operation is called a backoff operation. Then, the AP1 310 senses the channel during a predefined time (e.g., 9 us), and when it is determined that the channel is in the idle state, the selected variable N 355 can be subtracted by 1. That is, it is updated as N=N-1. When it is determined that the channel is occupied by the another device 320 during the time 330, the variable N 355 is not subtracted but is instead frozen. STA2 325 receives data 340 transmitted by the AP2 320 and transmits ACK or NACK 347 with respect to the reception of the data 340 to the AP2 320 after short interframe space (SIFS) time 345. The STA2 325 may transmit the ACK/NACK 347 without performing a separate channel sensing operation. After the transmission of the ACK 347 of the STA2 325 ends, the AP1 310 may know that the channel is in the idle state. The AP1 310 senses the channel during a predetermined time (e.g., 9 us) defined or set in advance for the backoff operation when it is determined that the channel is in the idle state for the DIFS time 350, and when it is determined that the channel is in the idle state, the selected variable N 355 is subtracted again. That is, it is updated as N=N-1. When N=0, the AP1 310 may occupy the channel to transmit the data 360 to the STA 1 315. Then, the terminal receiving the data 360 may transmit the ACK or NACK with respect to the reception of the data to the AP1 310 after the SIFS time. The AP1 310 receiving the NACK from the STA1 315 may select the random variable N used in the next backoff operation in the increased contention window. That is, when it is assumed that the contention window used is [1, 16], and the data reception result of the STA1 315 is NACK, the contention window of the AP1 310 receiving the NACK may be increased to [1, 32]. If the AP1 310 receives ACK in the above case, the contention window may be set to an initial value (e.g., [1, 16]) or a preset contention window may be decreased or maintained.

However, with a WiFi system, communication is generally performed between one AP (or base station) and one STA (or terminal) at the same time. Further, as 347 and 370 in FIG. 3, the STA1 and STA2 (or terminals 315, 325) transmits its data reception state (e.g., ACK or NACK) to the AP (or base station) immediately after the reception of the data. The AP 310 or 320 performs a channel sensing operation for the next data transmission operation after receiving ACK or NACK from the terminal 315 or 325. However, in the LAA system, one base station may transmit data to a plurality of terminals at the same time. Further, one or more terminals receiving the data at the same point in time (e.g., time n) may transmit ACK or NACK to the base station at the same time (e.g., n+4 in a case of FDD). Therefore, the LAA base station may receive the ACK or NACK from one or more terminals at the same point in time, unlike the WiFi system. In addition, time difference between the ACK/NACK transmission point in time of the terminal and the data transmission time of the base station may be at least 4 ms. Therefore, of the LAA base station sets (or resets) a contention window by the ACK/NACK received from the terminal like WiFi, since the base station may receive the ACK/NACK from a plurality of terminals at a specific time, uncertainty in setting the contention window may occur. Further, if the terminal performs an uplink channel sensing operation for uplink transmission, each terminal may independently perform the channel sensing operation. When the terminal independently performs the channel sensing operation as described above, only a terminal of which the channel sensing operation ends first may perform the set uplink transmission.

Accordingly, the present disclosure provides a method in which the base station sets a channel sensing period based on the uplink signal reception result received from the terminal, and performs a setting of the set channel sensing period for terminals such that the plurality of terminals may perform the channel sensing operation at the same time.

SUMMARY

Accordingly, an aspect of the present disclosure provides a method and an apparatus for setting a channel sensing period for an unlicensed band.

An aspect of the present disclosure provides that when performing a channel occupation operation in an unlicensed band, at least one of variables for the channel occupation operation is set by using a data reception result transmitted using the unlicensed band.

In accordance with an aspect of the present disclosure, there is provided a method for transmitting an uplink signal by a user equipment (UE) in a wireless communication system. The method includes receiving, from a base station, information on a listen-before-talk (LBT) channel sensing type, sensing a channel for an unlicensed band based on the information on the LBT channel sensing type, and transmitting, to the base station, the uplink signal in the unlicensed band after sensing the channel for the unlicensed band.

In accordance with an aspect of the present disclosure, there is provided a method for receiving an uplink signal by a base station in wireless communication system. The method includes generating information on a listen-before-talk (LBT) channel sensing type which is applied to a user equipment (UE), transmitting, to the UE, the information on the LBT channel sensing type and receiving, from the UE, the uplink signal in an unlicensed band after the UE senses a channel for the unlicensed band based on the information on the LBT channel sensing type.

In accordance with an aspect of the present disclosure, there is provided a user equipment (UE) for transmitting an uplink signal in wireless communication system. The UE includes a transceiver configured to transmit and receive a signal and a controller configured to receive, from a base station, information on a listen-before-talk (LBT) channel sensing type, sense a channel for an unlicensed band based on the information on the LBT channel sensing type, and transmit, to the base station, the uplink signal in the unlicensed band after e sensing the channel for the unlicensed band.

In accordance with an aspect of the present disclosure, there is provided a base station for receiving an uplink signal in wireless communication system. The base station includes a transceiver configured to transmit and receive a signal and a controller configured to generate information on a listen-before-talk (LBT) channel sensing type which is applied to a user equipment (UE), transmit, to the UE, the information on the LBT channel sensing type, and receive, from the UE, the uplink signal in an unlicensed band after the UE senses a channel for the unlicensed band based on the information on the LBT channel sensing type.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1A:
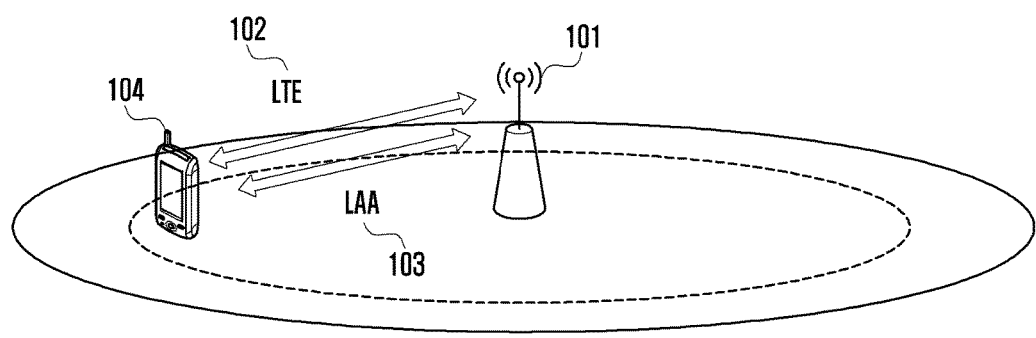
FIGS. 1A and 1B are diagrams illustrating a conventional communication system.
Figure 1B:
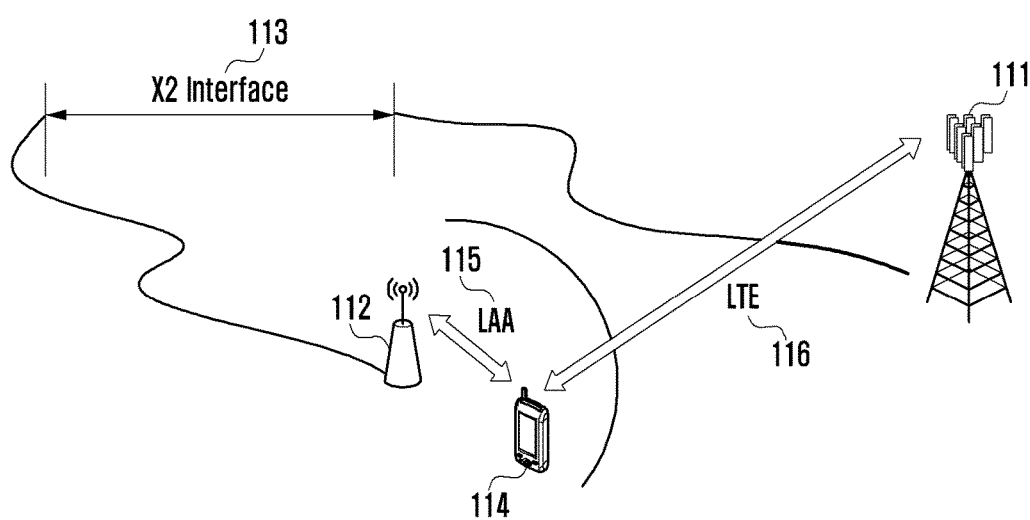
Figure 2:
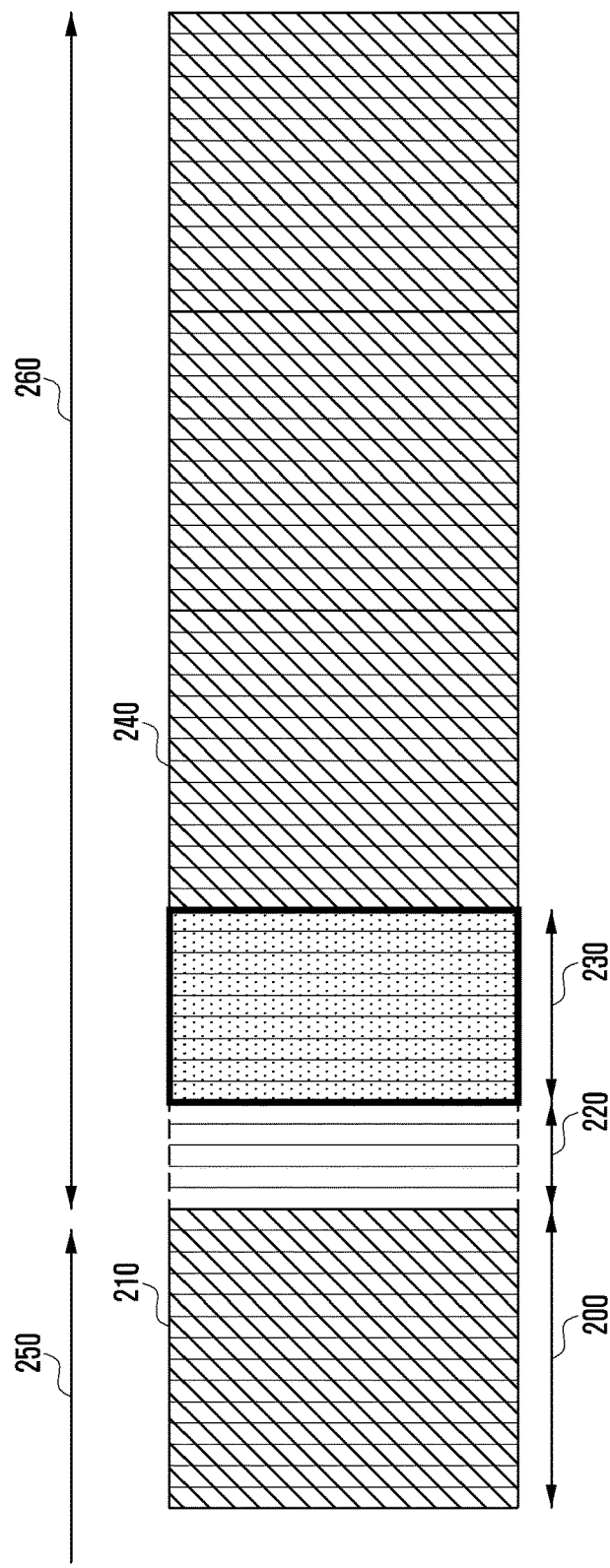
FIG. 2 is a diagram illustrating a channel occupation operation based on a channel sensing operation.
Figure 3:
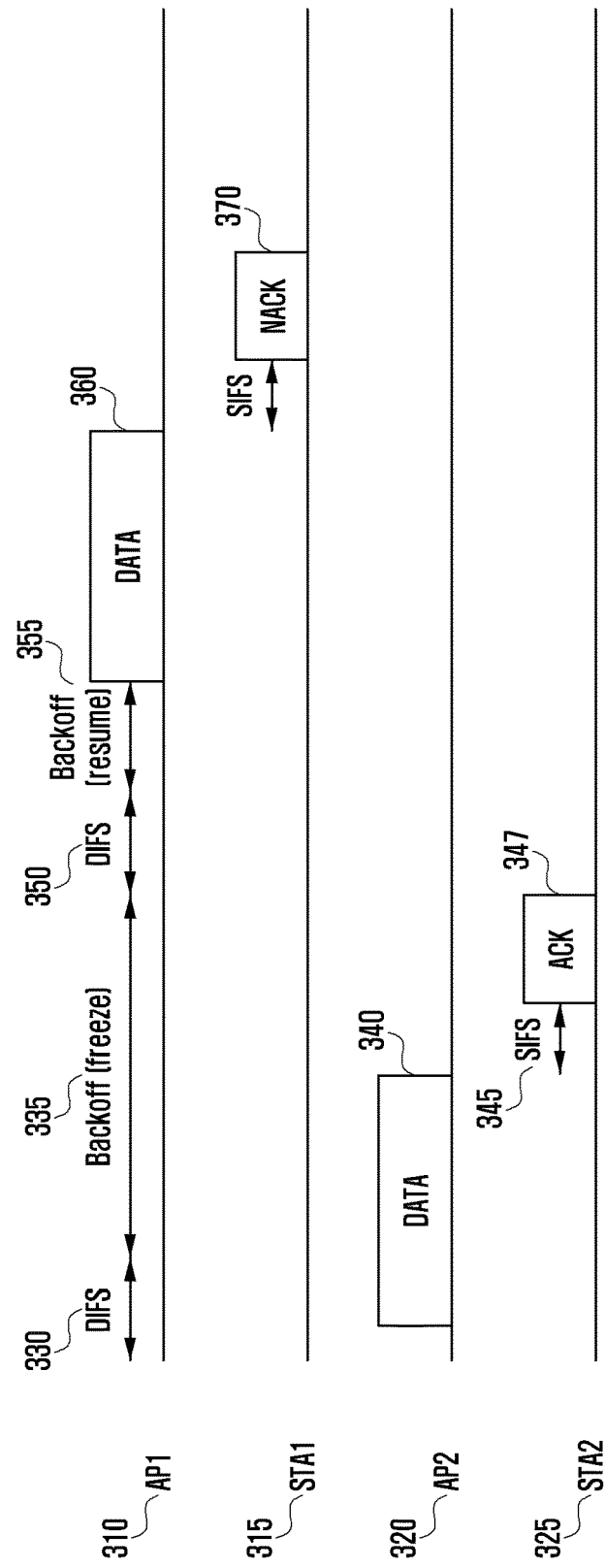
FIG. 3 is a diagram illustrating a channel access scheme for an unlicensed band of a WiFi system.

Embodiments of the present disclosure will be described herein below with reference to the accompanying drawings.

However, the embodiments of the present disclosure are not limited to the specific embodiments and should be construed as including all modifications, changes, equivalent devices and methods, and/or alternative embodiments of the present disclosure.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a CPU or an application processor) capable of performing a corresponding operation by executing one or more software programs stored in a memory device.

The term "module" as used herein may be defined as, for example, a unit including one of hardware, software, and firmware or two or more combinations thereof. The term "module" may be interchangeably used with, for example, the terms "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

Electronic devices according to the embodiments of the present disclosure may include at least one of, for example, smart phones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to an embodiment of the present disclosure, the wearable devices may include at least one of accessory-type wearable devices (e.g., watches, rings, bracelets, anklets, necklaces, glasses, contact lenses, or head-mounted-devices (HMDs)), fabric or clothing integral wearable devices (e.g., electronic clothes), body-mounted wearable devices (e.g., skin pads or tattoos), or implantable wearable devices (e.g., implantable circuits).

The electronic devices may be smart home appliances. The smart home appliances may include at least one of, for example, televisions (TVs), digital versatile disk (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, or electronic picture frames.

The electronic devices may include at least one of various medical devices (e.g., various portable medical measurement devices (such as blood glucose meters, heart rate monitors, blood pressure monitors, or thermometers, and the like), a magnetic resonance angiography (MRA) device, a magnetic resonance imaging (MRI) device, a computed tomography (CT) device, scanners, or ultrasonic devices, and the like), navigation devices, global positioning system (GPS) receivers, event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller machines (ATMs), points of sales (POSs) devices, or Internet of things (IoT) devices (e.g., light bulbs, various sensors, electric or gas meters, sprinkler devices, fire alarms, thermostats, street lamps, toasters, exercise equipment, hot water tanks, heaters, boilers, and the like).

The electronic devices may further include at least one of parts of furniture or buildings/structures, electronic boards, electronic signature receiving devices, projectors, or various measuring instruments (such as water meters, electricity meters, gas meters, or wave meters, and the like). The electronic devices may be one or more combinations of the above-mentioned devices. The electronic devices may be flexible electronic devices. Also, the electronic devices are not limited to the above-mentioned devices, and may include new electronic devices according to the development of new technologies.

Hereinafter, the electronic devices according to various embodiments of the present disclosure will be described with reference to the accompanying drawings. The term "user" as used herein may refer to a person who uses an electronic device or may refer to a device (e.g., an artificial intelligence electronic device) which uses an electronic device.

According to the present disclosure, it is possible to improve coexistence performance of a channel occupation operation between devices using an unlicensed band, thereby clearly setting a standard for the channel occupation operation.

Although the present disclosure is described herein using an LTE system and an LTE-A system, the present disclosure may be applied to other communication systems using a licensed band and an unlicensed band.

Figure 4:
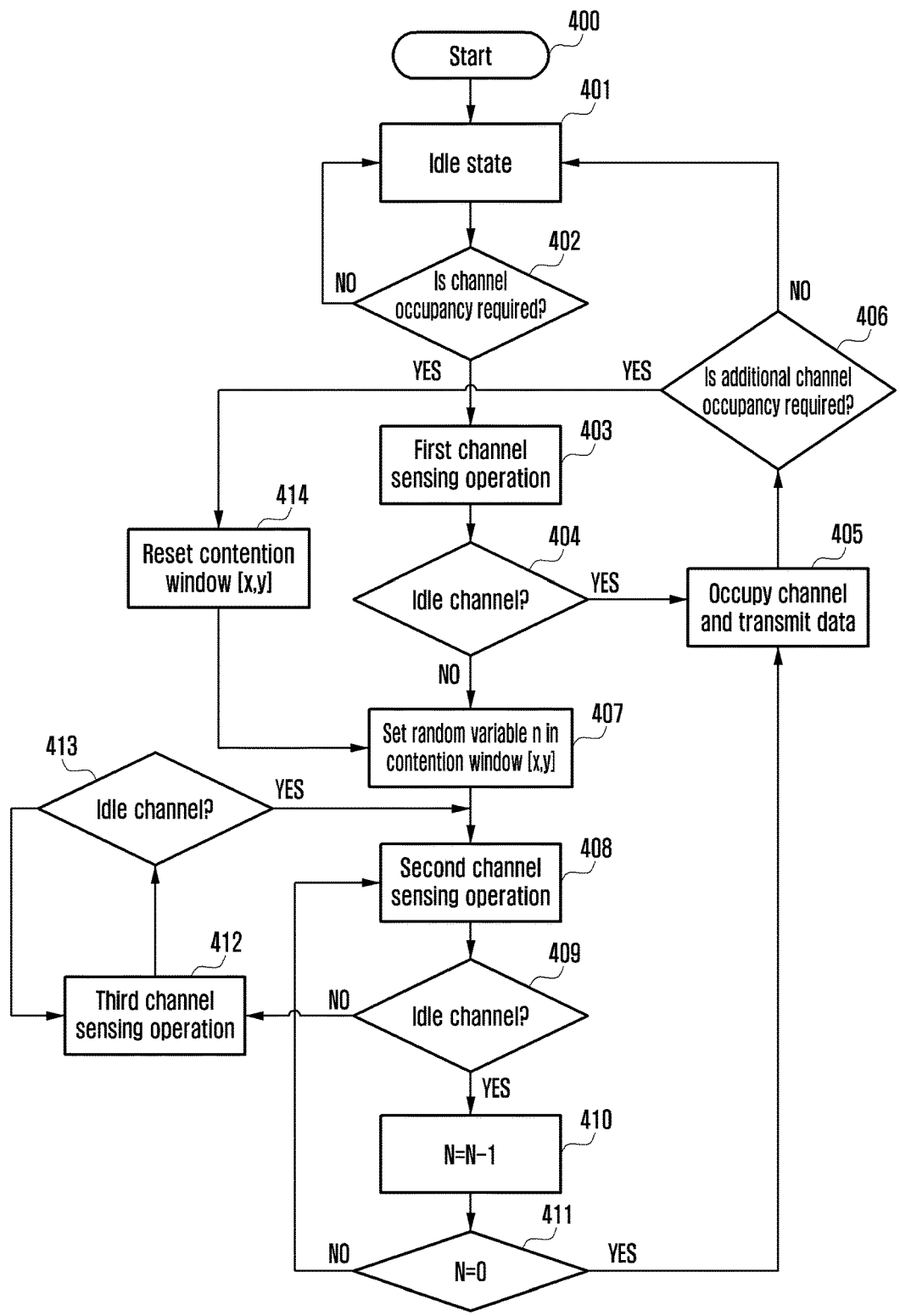
FIG. 4 is a flowchart of a method for a channel access scheme for an unlicensed band of an LAA system, according to an embodiment of the present disclosure.

FIG. 4 is a flowchart of a channel access method for unlicensed band of an LAA system, according to an embodiment of the present disclosure.

A channel occupancy method using an unlicensed band in an LAA system will be described with reference to FIG. 4. In step 401, an LAA cell (or LAA SCell, LAA Cell, LAA base station) that does not require data transmission maintains an idle state. The idle state is a state in which the LAA cell does not transmit a data signal to an unlicensed band. For example, the idle is a state in which an LAA cell, in an active state, has no more data signal to be transmitted, or has data to be transmitted to the terminal but does not transmit the data to the terminal.

When it is required that the LAA cell, in the idle state, occupies a channel to transmit data or control signal to the terminal in step 402, the LAA cell may perform a first channel sensing operation or function in step 403. The first channel sensing operation may be set to be different depending on at least one condition of a preset time (e.g., 34 us), a time set by other device, and a kind of data or control signal to be transmitted in the LAA cell.

For example, a time for performing the first channel sensing operation, in a case in which the LAA cell only transmits the control signal without data transmitted to a specific terminal, may be set to be different (e.g., when only transmitting the control signal, the first channel sensing operation is performed for a time shorter than that of a case of transmitting a data signal) from a time for performing the first channel sensing operation, in a case in which the LAA cell transmits data to the specific terminal.

Values that may be set for the first channel sensing operation may be defined in advance. At least one of other variables (e.g., a threshold value of an intensity of a received signal for determining whether the channel is occupied) of the first channel sensing operation in addition to the time for performing the first channel sensing operation may be set to be different between the case in which the LAA cell only transmits the control signal without data transmitted to a specific terminal and the case in which the LAA cell transmits data to the specific terminal.

The LAA cell may set a contention window used in a second channel sensing operation to an initial value. The first channel sensing operation is an operation for determining whether other devices occupy the corresponding channel using various methods including at least one of a method of measuring intensity of a received signal and a method of detecting a signal defined in advance, during the time set for the first channel sensing operation. The variables required for the first channel sensing operation including a time for performing the first channel sensing operation may use a preset value, or may be set by other devices.

When it is determined that the channel is in the idle state in step 404, the LAA cell may occupy the channel and transmit a signal in step 405. When it is determined that the channel is occupied by other devices in step 404, a random variable N may be selected in a contention window [x, y] set in step 407. An initial contention window may be set in advance (or may be reset) from the base station. Further, the set contention window may be set using various values including the number of attempts for occupying the channel, occupancy rate for the cannel (e.g., traffic load), and a reception result (e.g., ACK/NACK) of the terminal for the data signal transmitted at the time of occupying the channel.

When it is determined that the LAA cell occupying the channel in step 405 needs to additionally occupy the channel in step 406, the contention window may be set (reset) in step 414 using a result of data transmission performed in step 405 or at least one of various methods as mentioned above. The method for setting the contention window using the result of data transmission in step 405 is only one example, and the contention window may be set by a previous channel occupancy and data transmission step or a preset value.

When the LAA cell transmits data to the terminal in the channel occupancy period and receives NACK as a reception result for the data transmission from the terminal, the LAA cell may increase or maintain the contention window. When the LAA cell occupying the channel using the increased or maintained contention window transmits data to the terminal in the channel occupancy period and receives ACK as a reception result for the data transmission from the terminal, the LAA cell may decrease or maintain the contention window or set the contention window as an initial contention window. The method for setting a contention window using the ACK/NACK is merely an example, and the contention window may be set using other reference values.

When the random variable N is set in the preset contention window in step 407, a second channel sensing operation may be performed using the set N in step 408. The second channel sensing operation is an operation for determining whether the channel is occupied using at least one of a method of measuring intensity of received signal and a method of detecting signal defined in advance, during a set time, and determination criteria different from that of the first sensing operation may be set. That is, a time for performing the second channel sensing operation may be set to be the same as or shorter than that for performing the first channel sensing operation. For example, the time for performing the first channel sensing operation may be set to be 34 us, and the time for performing the second channel sensing operation may be set to be 9 us. Further, a reference threshold value of the second channel sensing operation may be set to be different from a reference threshold value of the first channel sensing operation.

When it is determined that the channel sensed in step 408 is an idle channel in step 409, 1 is subtracted from the set variable N in step 410. A different value, however, may be subtracted depending on a set value, or the subtracted value may be set to be different depending on a kind or characteristics of signals to be transmitted by the LAA cell.

When a subtracted value of the variable N is 0 in step 411, the LAA cell may perform channel occupancy and data transmission in step 405. When the value of the variable N is not 0 in step 411, the LAA cell may perform the second channel sensing operation again in step 408. When it is determined that the channel is not the idle channel in step 408 through the second channel sensing operation in step 409, the LAA cell may perform a third channel sensing operation through step 412. The third channel sensing operation may be set identically to the first channel sensing operation or the second channel sensing operation. For example, both of a time for performing the first channel sensing operation and a time for performing the third channel sensing operation may be set to be 34 us. The reference threshold value of the first channel sensing operation may be set to be different from a reference threshold value of the third channel sensing operation. The time for performing the channel sensing operation and the threshold value are merely examples, and variables or reference values required for the third channel sensing operation may be set to be the same as those of the first channel sensing operation or at least one of them may be set to be different from those of the first channel sensing operation.

Further, the third channel sensing operation may be set to perform an operation generating time delay without a separate operation for sensing or occupying the channel. The time for performing the third channel sensing operation may be set to be identical or different from at least one of those for performing the first channel sensing operation or the second channel sensing operation. The LAA cell determines whether other devices occupy the channel in step 413 using the reference values set for the third channel sensing operation. When the determined channel occupancy state is the idle state, the second channel sensing operation may be performed again in step 408. In a case in which the channel occupancy state determined in step 413 is not the idle state, the LAA cell may perform the set third channel sensing operation in step 412. At least one of the first channel sensing operation, the second channel sensing operation, and the third channel sensing operation may be omitted depending on the type or characteristics of the data or control signal to be transmitted by the LAA cell.

When the LAA cell only transmits the control signal (e.g., discovery reference signal (DRS)), the LAA cell may immediately occupy the channel after performing only the first channel sensing operation according to the result of the channel sensing operation. The DRS is merely an example in which at least one of the first channel sensing operation, the second channel sensing operation, and the third channel sensing operation may be omitted, and the DRS may also be applied at the time of transmitting other control signal.

If the terminal performs an uplink channel occupancy or an uplink channel sensing operation for uplink transmission by the above described channel sensing method and the channel occupation method, each terminal may independently perform the channel sensing operation. If the terminal independently performs a channel sensing operation, each terminal has a different channel sensing period that is randomly selected in the contention window as in step 407. Therefore, if a plurality of terminals are scheduled in one uplink subframe, a terminal of which the channel sensing operation ends first among the terminals may start uplink transmission first. Therefore, a terminal that is performing the channel sensing operation may not complete the channel sensing operation due to an uplink signal transmitted by the terminal. That is, in the above case, only the terminal of which the channel sensing operation ends first may perform the set uplink transmission.

Accordingly, the present disclosure proposes a method in which a base station sets a channel sensing period based on the uplink signal reception result received from the terminal, and performs a setting of the set channel sensing period for terminals such that the plurality of terminals may perform the channel sensing operation at the same time, in order for the terminals of which uplink transmission is set in the same subframe not to set different channel sensing periods from each other.

Figure 5:
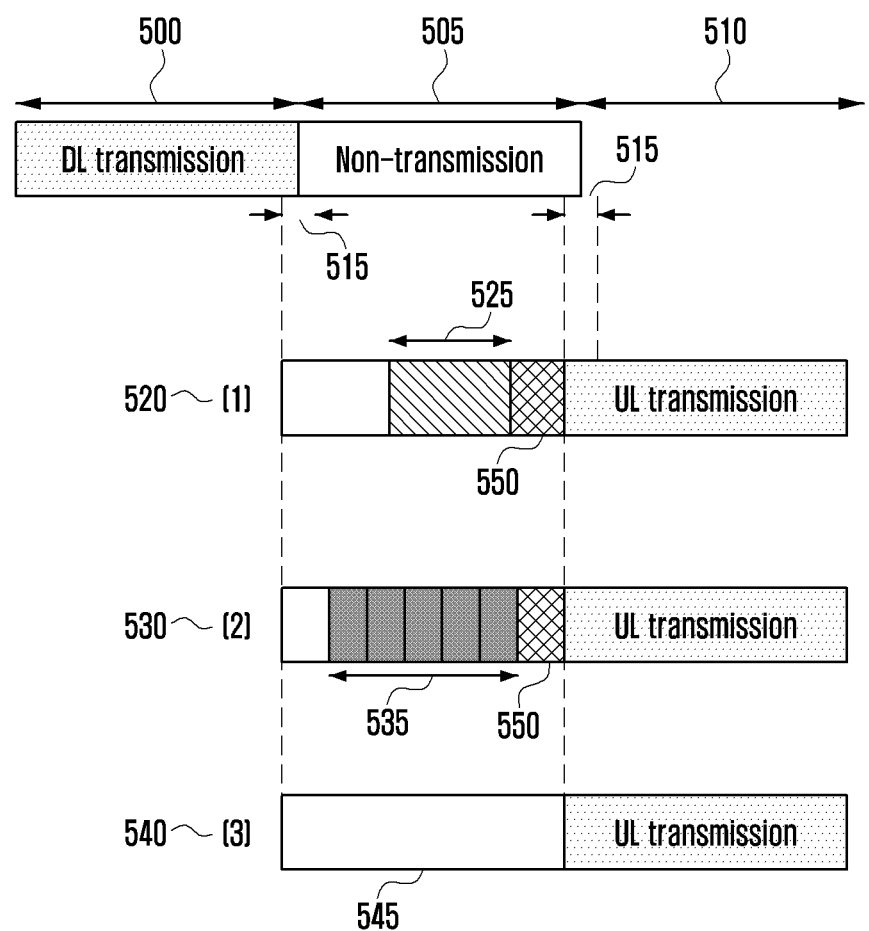
FIG. 5 is a diagram of a method for performing a channel sensing operation, according to an embodiment of the present disclosure.

FIG. 5 is a diagram of a method for performing a channel sensing operation, according to an embodiment of the present disclosure.

In view of an LAA cell and an LAA terminal receiving control and data signals from the LAA cells, an uplink channel sensing operation and a channel access method of the LAA terminal will be described with reference to FIG. 5.

The LAA terminal may receive scheduling information for uplink transmission in subframe n to subframe n+K from one cell of cells operating in an unlicensed band or a licensed band. K may be defined by the base station and the terminal in advance or set by the base station through a higher layer signal for the terminal, or the base station may perform a setting of a time relation between an uplink transmission setting point in time and a start point in time of the set uplink transmission for the terminal by including the K value in uplink transmission setting information (for example, DCI format 0, 4, or DCI format modified for newly introduced for setting uplink transmission).

For convenience of explanation, a case in which K=4 (ms) will be assumed and explained, but K may be set to a value greater than or equal to than 1 ms. In order to minimize delay between the uplink transmission setting and actual uplink transmission, K may also be set in a unit less than K=1 (ms).

If the set uplink signal transmission is uplink transmission for an unlicensed band, the terminal performs a channel sensing operation before performing the set uplink transmission, and if it is determined that the unlicensed band is in an idle state, the set uplink transmission may be performed. If it is determined that the unlicensed band is occupied by other devices, the terminal may not perform the set uplink transmission.

When downlink transmission of the LAA cell is performed when the LAA terminal performs the channel sensing operation for the unlicensed band, the LAA terminal may determine that the channel is occupied by other devices due to a downlink signal of the LAA cell. Accordingly, the LAA cell and the LAA terminal may transmit no signal in the time and frequency resources immediately before performing the unlink transmission or when the LAA terminal performs the channel sensing operation for the unlicensed band.

The channel sensing operation performed by the LAA terminal for an unlicensed band may be performed by using at least one of the following methods:

Method 1: Uplink signal transmission for a fixed time after sensing a channel for an unlicensed band;

Method 2: Uplink signal transmission for a variable time after sensing a channel for an unlicensed band; and Method 3: Uplink signal transmission without sensing a channel.

With respect to Method 1, the LAA terminal of which uplink signal transmission is set in an unlicensed band may perform a channel sensing operation for the unlicensed band in which the uplink signal transmission is set for a fixed channel sensing period 525 before the set uplink signal transmission. If a point in time when the channel sensing operation ends is earlier than the set uplink signal transmission point in time, the terminal may transmit an occupancy signal 550 for occupying the channel from the point in time when the channel sensing operation ends to the uplink signal transmission point in time. If the channel sensing operation ends immediately before the uplink signal transmission point in time, the occupancy signal may not be transmitted. The occupancy signal may be one of an implementation signal that may be differently transmitted depending on implementation of a terminal, a signal in a preamble form (e.g., PRACH), and an SRS signal.

Method 1 is a method in which a channel sensing operation for an unlicensed band in which uplink signal transmission is set is performed for a fixed channel sensing period at a fixed point in time. For example, the channel sensing operation may be performed at a position where the channel sensing operation may end immediately before starting of a first symbol transmitted in an uplink subframe in which the uplink signal transmission is set, or the channel sensing operation may be performed at a starting point in time of the last OFDM symbol in a subframe immediately before the uplink subframe in which the uplink signal transmission is set. The channel occupancy signal may be transmitted immediately before starting of the first symbol transmitted in the uplink subframe in which the uplink signal transmission is set. Further, the channel sensing operation may be performed in the first OFDM or SC-FDMA symbol in the uplink subframe in which the uplink signal transmission is set.

The channel sensing operation may be performed at a position where the channel sensing operation may end immediately before starting of a second OFDM or SC-FDMS symbol in the uplink subframe, or the channel sensing operation may be performed at a starting point in time of the first OFDM or SC-FDMA symbol in a subframe of the uplink subframe in which the uplink signal transmission is set. The channel occupancy signal may be transmitted to immediately before starting of the second symbol transmitted in the uplink subframe in which the uplink signal transmission is set.

With respect to Method 2, the LAA terminal of which uplink signal transmission is set in an unlicensed band may perform a channel sensing operation for the unlicensed band in which the uplink signal transmission is set for a channel sensing period 535 that is set before the set uplink signal transmission. The channel sensing period 535 may be randomly selected in a contention window of the LAA terminal or set by the base station. Further, the channel sensing period 535 may be configured of one fixed period 533 and one or more variable periods 537. The channel sensing period 535 may also be configured of the variable periods 537 without the fixed period 533, or may also be configured of only one variable period.

Further, Method 2 is a method in which a channel sensing operation for an unlicensed band in which uplink signal transmission is set is continuously performed at a random point in time. For example, the channel sensing operation may be performed at a position where the channel sensing operation may end immediately before starting of a first symbol transmitted to the channel sensing period in an uplink subframe in which the uplink signal transmission is set, or the channel sensing operation may be performed at a starting point in time of the last OFDM symbol in a subframe immediately before the uplink subframe in which the uplink signal transmission is set. At this point, the channel occupancy signal may be transmitted to immediately before starting of the first symbol transmitted in the uplink subframe in which the uplink signal transmission is set.

Further, the channel sensing operation may be performed in the first OFDM or SC-FDMA symbol in the uplink subframe in which the uplink signal transmission is set. Further, the channel sensing operation may be performed in the first OFDM or SC-FDMA symbol in the set uplink subframe. The channel sensing operation may be performed at a position where the channel sensing operation may end immediately before a starting of a second OFDM or SC-FDMS symbol in the uplink subframe, or the channel sensing operation may be performed at a starting point in time of the first OFDM or SC-FDMA symbol in a subframe of the uplink subframe in which the uplink signal transmission is set. The channel occupancy signal may be transmitted to immediately before starting of the second symbol transmitted in the uplink subframe in which the uplink signal transmission is set.

The base station may inform of or provide a size of a contention window of the LAA terminal, and the LAA terminal may randomly set a channel sensing period within the contention window. Information on the channel sensing period may be informed or provided to the terminal setting uplink transmission when the base station transmits uplink control information of the terminal or may be informed to all terminals through a common downlink control channel.

The LAA terminal can have a preset contention window size and may use (or change) the contention window size in consideration of a retransmission scheduling related value (e.g., a new data indicator (NDI)) transmitted from the base station.

If a point in time when the channel sensing operation ends is earlier than the set uplink signal transmission point in time, the terminal may transmit an occupancy signal 550 for occupying the channel from the point in time when the channel sensing operation ends to the uplink signal transmission point in time. At this point, if the channel sensing operation ends immediately before the uplink signal transmission point in time, the occupancy signal may not be transmitted. The occupancy signal may be one of an implementation signal that may be differently transmitted depending on implementation of a terminal, a signal in a preamble form (e.g., PRACH), and an sounding reference signal (SRS) signal.

With respect to Method 3, the LAA terminal of which uplink signal transmission is set in an unlicensed band may perform the set uplink signal transmission without a separate channel sensing operation before the set uplink signal transmission. Method 3 may be applied to a case in which after an LAA cell performs a channel sensing operation for downlink transmission, the LAA cell occupying the channel sets uplink signal transmission of an LAA terminal through a downlink control channel, and uplink transmission 510 of the LAA terminal is performed immediately after downlink transmission 500 of the LAA cell ends, or ending of the downlink transmission 500 of the LAA cell and starting of the uplink transmission 510 of the LAA terminal are performed within a predetermined time 505 (e.g., within 25 us).

At least one of the methods for a channel sensing operation (Method 1, Method 2, or Method 3) and a channel sensing period for the method may be set to be different depending on whether a cell setting the uplink signal transmission (or a cell scheduling uplink transmission) is a licensed band cell or an unlicensed band cell. If the cell setting the uplink signal transmission is an unlicensed band cell, at least one of the methods for a channel sensing operation and a channel sensing period may be set to be different depending on whether the cell setting the uplink signal transmission is the same unlicensed band cell as the cell in which the terminal performs uplink signal transmission, or an unlicensed band cell that is different from the cell in which the uplink signal transmission is performed among unlicensed band cells. When the uplink signal transmission is set in an unlicensed band cell that is operated in another spectrum that is different from a licensed band or an unlicensed band cell in which uplink signal transmission is performed, the uplink channel sensing operation may be set to be performed according to Method 2, and when the uplink signal transmission is set in the same unlicensed band cell as the unlicensed band cell in which uplink signal transmission is performed, the uplink channel sensing operation may be set to be performed according to Method 1. When the uplink signal transmission is set in an unlicensed band cell that is operated in other spectrum that is different from a licensed band or an unlicensed band cell in which uplink signal transmission is performed, a required length of a channel sensing operation period may be set to be longer than a required length of a channel sensing operation period when the uplink signal transmission is set in the same unlicensed band cell as the unlicensed band cell in which uplink signal transmission is performed. In Method 2, a required minimum average length of a channel sensing operation period may be set to be different by differently setting a minimum value or a maximum value of a contention window depending on a cell in which the uplink signal transmission is set.

For example, in Method 1, a size of a channel sensing period (in a case in which a cell setting uplink signal transmission is a licensed band cell, or in a case in which a cell setting uplink signal transmission is an unlicensed band cell that is different from an unlicensed cell in which uplink signal transmission is performed among unlicensed band cells) may be set to be greater than or equal to that in a case in which a cell setting uplink signal transmission is the same unlicensed band cell as the unlicensed cell in which uplink signal transmission is performed among unlicensed band cells. A size of a channel sensing period that is set to be different depending on a cell setting the uplink signal transmission may be set by a higher layer signal or defined in advance. The size of the channel sensing period may be set to be different depending on a set kind of uplink signal. A size of a channel sensing period in a case of transmitting an uplink signal including an uplink data channel may be set to be greater than or equal to that in a case of transmitting an uplink signal (e.g., uplink control channel, SRS, PRACH, etc.) that does not include an uplink data channel.

In Method 2, a size of a channel sensing period or a size of a contention window (in a case in which a cell setting uplink signal transmission is a licensed band cell, or in a case in which a cell setting uplink signal transmission is an unlicensed band cell that is different from an unlicensed cell in which uplink signal transmission is performed among unlicensed band cells) may be set to be greater than or equal to those in a case in which a cell setting uplink signal transmission is the same unlicensed band cell as the unlicensed cell in which uplink signal transmission is performed among unlicensed band cells. A size of a channel sensing period or a size of a contention window that is set to be different depending on a cell setting the uplink signal transmission may be set by a higher layer signal or defined in advance. The size of the channel sensing period or the size of the contention window may be set to be different depending on a set kind of uplink signal. For example, a size of a channel sensing period or a size of a contention window in a case of transmitting an uplink signal including an uplink data channel may be set to be greater than or equal to than those in a case of transmitting an uplink signal (e.g., uplink control channel, SRS, PRACH, etc.) that does not include an uplink data channel.

The base station may differently set the uplink channel sensing operation and at least one of relevant variable values depending on a kind or characteristics of a cell setting uplink signal transmission (e.g., when a cell setting uplink signal transmission is a licensed band cell, when a cell setting uplink signal transmission is an unlicensed band cell that is different from an unlicensed cell in which uplink signal transmission is performed among unlicensed band cells, or when a cell setting uplink signal transmission is the same unlicensed band cell as the unlicensed cell in which uplink signal transmission is performed among unlicensed band cells), or depending on a kind or characteristics of an uplink transmission signal of the terminal (e.g., in a case of transmitting an uplink signal including an uplink data signal, or in a case of transmitting an uplink control signal or control channel without including an uplink data signal), and may perform a setting of the set channel sensing operation and variable values for the terminal using a higher layer signal. For example, in a case in which a cell setting uplink signal transmission is a licensed band cell, or in a case in which a cell setting uplink signal transmission is an unlicensed band cell that is different from an unlicensed cell in which uplink signal transmission is performed among unlicensed band cells, a channel sensing operation using a variable period like Method 2 may be set or defined in advance, and in a case in which a cell setting uplink signal transmission is the same unlicensed band cell as the unlicensed cell in which uplink signal transmission is performed among unlicensed band cells, a channel sensing operation using a fixed period like Method 1 may be set or defined in advance.

The base station may perform a setting of a method for a channel sensing operation for the terminal by including a field for setting a method (LBT type) for a channel sensing operation to be performed by the terminal in uplink transmission setting information of the terminal.

The base station may transmit the information on the channel sensing type to the UE through a UL grant. The information on the channel sensing type may be information for setting whether to perform the channel sensing operation using the fixed time period like the Method 1 or whether to perform the channel sensing operation using the variable time period like the Method 2.

Based on the information on the channel sensing type, the UE may transmit the uplink signal to the base station after performing the channel sensing operation during the fixed time period according to the Method 1. In addition, based on the information on the channel sensing type, the UE may transmit the uplink signal to the base station after performing the channel sensing operation during the variable time period according to the Method 2. The variable time period may be randomly set based on the contention window for the UE. For example, the variable time period may be determined based on a randomly selected value and a minimum sensing slot in the contention window.

The terminal receiving the uplink transmission setting information may perform a channel sensing operation for the set uplink unlicensed band according to the method for a channel sensing operation (or LBT type) included in the information and instructed by the base station. Detailed information (e.g., a length of a channel sensing period, a size of a contention window, etc.) required for the channel sensing operation may be defined in advance by the base station and the terminal, set by base station for the terminal through a higher layer signal, or set for the terminal by being included in the uplink transmission setting information.

When the base station sets uplink transmission of the terminal, in a case in which information (e.g., a length of a channel sensing period, or a size of a contention window) required for a channel sensing operation of the terminal is set for the terminal, if one or more terminals are scheduled in a subframe in which the corresponding uplink transmission is set, e.g., an uplink subframe n, the base station may inform terminals of a length of a channel sensing period or a size of a contention window that is determined for each terminal through the channel sensing operation, respectively, as the information required by one or more terminals of which uplink transmission is set in the subframe n for a channel sensing operation (a length of a channel sensing period or a size of a contention window). When the terminal performing the channel sensing operation in the subframe n, however, uses different lengths of a channel sensing period, or different sizes of a contention window to perform the channel sensing operation, if there is a terminal that ends first the channel sensing operation, and occupies the channel to perform uplink transmission among the terminals, other terminals receiving an uplink signal transmitted by the terminal may not properly perform a channel sensing operation. Accordingly, the base station may inform each terminal of the same length of a channel sensing period or the same size of a contention window as the information (a length of a channel sensing period, or a size of a contention window) required by the one or more terminals of which uplink transmission is set in the subframe n for a channel sensing operation, respectively. In determining the same length of a channel sensing period or the same size of a contention window, the base station may select a maximum value of lengths of a channel sensing period or sizes of a contention window that are determined for each terminal of which uplink transmission is set in the subframe n, and the base station may inform the terminals performing uplink transmission in the subframe n of the maximum value. As another method, the base station may also perform a setting so that the terminals having the same value among lengths of a channel sensing period or sizes of a contention window that are determined for respective terminals of which uplink transmission is set in the subframe n perform uplink transmission in the subframe n.

Further, the base station selects a value to be used in the subframe n among lengths of a channel sensing period or sizes of a contention window that are determined for respective terminals of which uplink transmission is set in the subframe n. The base station also calculates a position and the number of symbols excluded from uplink transmission in the uplink subframe n, or a position of a start symbol and a position of an end symbol in which uplink transmission is actually performed in the uplink subframe n, based on the selected length of a channel sensing period or the selected size of a contention window. Even in a case in which the base station differently informs respective terminals of a length of a channel sensing period or a size of a contention window, at least one of a position of a start symbol and a position of an end symbol in which uplink transmission is actually performed in the uplink subframe n needs to be identically set for the terminals performing uplink transmission in the uplink subframe n. If an uplink transmission starting point in time of one or more terminals is different in the uplink subframe n, other terminals receiving an uplink signal transmitted by the terminal may not properly perform a channel sensing operation.

Accordingly, the base station may calculate a time required for an uplink channel sensing operation in the subframe n based on at least one of a length of a channel sensing period or a size of a contention window that is determined for each terminal of which uplink transmission is set in the subframe n, e.g., based on at least one of a maximum size of a contention window, an average length of a channel sensing period that may be selected from the maximum size of a contention window, a maximum average size of a contention window, and an average length of a channel sensing period that may be selected from the maximum average size of a contention window of terminals intending to setting uplink transmission in the subframe n. The base station may also identically inform the terminals performing uplink transmission of an uplink transmission start symbol or an uplink transmission starting point in time, and an uplink transmission end symbol or an uplink transmission ending point in time in the subframe n based thereon.

The base station may select terminals having at least one same value of a maximum size of a contention window, an average length of a channel sensing period that may be selected from the maximum size of a contention window, a maximum average size of a contention window, and an average length of a channel sensing period that may be selected from the maximum average size of a contention window as the terminals setting uplink transmission in the subframe n to calculate a time required for an uplink channel sensing operation in the subframe n. The base station may also inform the terminals performing uplink transmission of an uplink transmission start symbol or an uplink transmission starting point in time, and an uplink transmission end symbol or an uplink transmission ending point in time in the subframe n based thereon.

Further, the terminal can be configured so that uplink signal transmission in N uplink subframes (multi-subframe scheduling) may be performed as one uplink transmission setting information that is transmitted from the base station in a subframe n for the uplink signal transmission of the terminal in a downlink control channel of at least one of a licensed band cell, an unlicensed band cell different from the uplink transmission cell, and the same unlicensed band cell as the uplink transmission cell that includes a subframe n+K. A method for a channel sensing operation that is performed before transmission in one set subframe or a plurality of set uplink subframes (or UL burst) starts and a method for a channel sensing operation that is performed by the terminal occupying the uplink channel in the occupied uplink subframe may be different from each other. For example, in a terminal configured so that uplink signal transmission in N uplink subframes (multi-subframe scheduling) may be performed as one uplink transmission setting information that is transmitted from the base station in a subframe n for the uplink signal transmission of the terminal that includes a subframe n+K, the channel sensing operation performed before the set uplink subframe (or UL burst) transmission starts may be performed according to a channel sensing method having a variable period link Method 2. The channel sensing operation performed by the terminal occupying an uplink channel by performing the channel sensing operation according to Method 2 in the plurality of set uplink subframes may be performed according to a channel sensing method having a fixed channel sensing period like Method 1. A required minimum average length of a channel sensing period of a channel sensing operation (Method 1) performed in the plurality of set uplink subframes may be set to be shorter than that of a channel sensing operation (Method 2) performed before the set uplink subframe (or UL burst) transmission starts.

Further, in the terminal configured so that uplink signal transmission in N uplink subframes (multi-subframe scheduling) may be performed as one uplink transmission setting information that is transmitted from the base station in a subframe n for the uplink signal transmission of the terminal in a downlink control channel of at least one of a licensed band cell, an unlicensed band cell different from the uplink transmission cell, and the same unlicensed band cell as the uplink transmission cell includes a subframe n+K. A method for a channel sensing operation that is performed before transmission in one set subframe or a plurality of set uplink subframes (or UL burst) starts and a method for a channel sensing operation that is performed by the terminal occupying the uplink channel in the occupied uplink subframe may be identical to each other. For example, when a terminal 1 configured so that uplink signal transmission in N uplink subframes (multi-subframe scheduling) may be performed as one uplink transmission setting information that is transmitted from the base station in a subframe n for the uplink signal transmission of the terminal includes a subframe n+K as described above, and a terminal 2 configured so that uplink signal transmission in some uplink subframes (M<N) among the N uplink subframes may be performed coexist, since a channel sensing operation of the terminal 2 exists in an uplink subframe transmission period of the terminal 1, the terminal 2 may be configured to perform the same channel sensing operation as the channel sensing operation performed by the terminal 1 in the plurality of set uplink subframe. In other words, in the terminal configured so that uplink signal transmission in N uplink subframes (multi-subframe scheduling) may be performed as one uplink transmission setting information that is transmitted from the base station in a subframe n for the uplink signal transmission of the terminal in a downlink control channel of at least one of a licensed band cell, an unlicensed band cell different from the uplink transmission cell, and the same unlicensed band cell as the uplink transmission cell includes a subframe n+K, a channel sensing operation is performed for starting the set uplink transmission according to a method (LBT type) for a channel sensing operation included in the uplink transmission setting. In the N uplink subframe transmission periods, a method for a channel sensing operation that is the same as the method for a channel sensing operation included in the uplink transmission setting may be performed, or a method for a channel sensing operation that is different from the method for a channel sensing operation included in the uplink transmission setting may be performed. When a method for a channel sensing operation that is different from the method for a channel sensing operation included in the uplink transmission setting is performed, the method for a channel sensing operation performed in the N uplink subframe transmission periods may be defined in advance by the base station and the terminal, set by the base station for the terminal through a higher layer signal, or set by the base station for the terminal by adding a field for setting the method for a channel sensing operation to the uplink transmission setting information.

Operations for Method 2 will now be described.

The base station may set a channel sensing period for uplink signal transmission of the terminal through a downlink control channel for the terminal. The channel sensing period may be configured of a fixed period and/or a variable period, and the variable period may be randomly selected in an uplink contention window of the base station. Accordingly, the channel sensing period may vary depending on a length of a randomly selected variable period (in other words, the number of the back-off counter). Therefore, the channel sensing period set by the base station for the terminal can be a length of the variable period or the number of the back-off counter. A total channel sensing period required by the terminal for an uplink channel sensing operation includes a fixed period and a variable period set by the base station.

As described above, in order to set a channel sensing period required for an uplink channel sensing operation of the terminal, the base station needs to set a contention window. A method for setting, by the base station, a contention window for an uplink channel sensing operation can include the base station determining a reference subframe before a channel sensing period setting point in time for a channel sensing operation according to a result of uplink data channel reception of the terminal that is received before the base station sets a channel sensing period required for uplink channel sensing operation for the terminal. The base station can also set a contention window according to an uplink data channel reception result transmitted from the terminal in the reference subframe.

Figure 6:
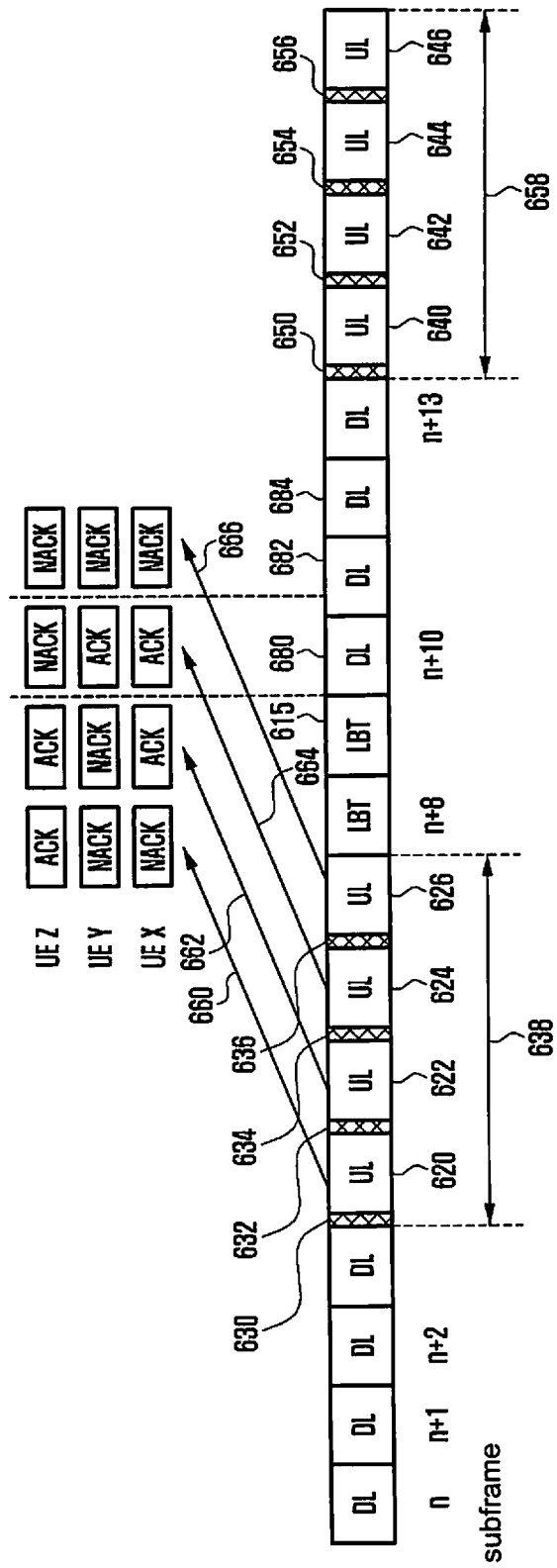
FIG. 6 is a diagram of a method for setting a contention window and a channel sensing period, according to an embodiment of the present disclosure.

FIG. 6 is a diagram illustrating a method for setting the contention window and a channel sensing period, according to an embodiment of the present disclosure.

Method 2-1: The base station defines a first uplink subframe 620 in a latest uplink transmission period 638 that is set before a channel sensing period setting point in time 680 for an uplink channel sensing operation 650 of the terminal as a reference subframe. The base station increases a contention window when Z % or more of NACK of the uplink data channel reception result 660 transmitted from the terminal in the reference subframe is generated.

Method 2-2: The base station increases a contention window when Z % or more of NACK of the uplink data channel reception results 660 and 662 (which is received from the terminal determined before the channel sensing period setting point in time 680 for the uplink channel sensing operation 650 of the terminal in the latest uplink transmission period 638 that is set before the channel sensing period setting point in time 680 for the uplink channel sensing operation 650) is generated.

Method 2-3: The base station increases a contention window when Z % or more of NACK of the uplink data channel reception result 662 (which is in an uplink subframe that is most recently determined before the channel sensing period setting point in time 680 for the uplink channel sensing operation 650 of the terminal) is generated.

If Z % or more of NACK of the uplink data channel reception result, which is transmitted from the terminal in the reference subframe used for changing a contention window in Methods 2-1, 2-2, and 2-3 is not generated, it is possible to decrease or initialize the contention window. Z may be defined in advance by the base station and the terminal, or set by the base station for the terminal through a higher layer signal as a value of 10, 20, 50, 80, or 100%. The Z value may be defined to be different according to a regulation for each region or each frequency spectrum. Further, the Z value may be set to be different depending on whether a cell setting uplink signal transmission (or a cell scheduling uplink transmission) is a licensed band cell or an unlicensed band cell. In other words, if the cell setting the uplink signal transmission is an unlicensed band cell, the Z value may be set to be different depending on whether the cell setting the uplink signal transmission is the same unlicensed band cell as the cell in which the terminal performs uplink signal transmission, or an unlicensed band cell that is different from the cell in which the uplink signal transmission is performed among unlicensed band cells. For example, when the uplink signal transmission is set in an unlicensed band cell that is operated in another spectrum that is different from a licensed band or an unlicensed band cell in which uplink signal transmission is performed, Z % is set to be low as compared to a case in which the uplink signal transmission is set in the same unlicensed band cell as the unlicensed band cell in which uplink signal transmission is performed, thereby making it possible to differently set a probability with which a contention window is changed, depending on whether a channel sensing operation for the unlicensed band is performed.

Further, a contention window may be increased by at least one of an exponential increase method, a linear increase method, and a method of increasing within a contention window set that is defined in advance. Moreover, an uplink data channel transmission result used once for setting a contention window as a reference subframe may not be used for setting other contention windows. Additionally, although the base station configures uplink transmission for an unlicensed band through a licensed band downlink, in a case in which it is determined that uplink transmission received from the terminal configuring the uplink transmission is determined as DTX, if the uplink transmission determined as DTS as described above is included in a reference subframe, the uplink transmission result may not be reflected in criteria for changing a contention window. Although the base station configures uplink transmission for an unlicensed band through unlicensed band downlink, in a case in which it is determined that uplink transmission received from the terminal configuring the uplink transmission is determined as DTX, if the uplink transmission determined as DTS as described above is included in a reference subframe, the uplink transmission result may be determined as NACK and included in criteria for changing a contention window. If the base station determines that the uplink transmission result of the terminal is NACK/DTX, any state, etc., the uplink transmission result may be determined as NACK and included in criteria for changing a contention window.

A reference subframe that is actually applied in changing a contention window in Methods 2-1, 2-2, and 2-3 may be different depending on a point in time when uplink data channel reception result transmitted from the terminal in the reference subframe is determined. In other words, a point in time when uplink data channel reception result transmitted from the terminal in the reference subframe is determined as ACK/NACK may be different for each base station.

For example, in FIG. 6, the base station 1 may determine in a subframe n+6 an uplink data channel reception result transmitted from the terminal in a subframe n+4, and another base station 2 may determine in a subframe n+7 an uplink data channel reception result transmitted from the terminal in the subframe n+4. To solve the above problem, the reference subframe may be defined as a reference subframe that is valid after a predetermined time base on a point in time when the terminal transmits an uplink data channel. For example, an uplink data channel reception result transmitted from the terminal in the subframe n+4 may be determined as valid after a subframe n+K (e.g., K=3 or 4), and a contention window may be increased by using one of Methods 2-1, 2-2, and 2-3 when N % or more of NACK of the uplink data channel reception result transmitted from the terminal in the valid reference subframe is generated. If it is assumed that K=3 (even when the base station determines at 666 in a subframe n+9 a transmission result of an uplink data channel 626 transmitted by the terminal in a subframe n+7) the base station may not include the transmission result of the uplink data channel 626 transmitted in the subframe n+7 that does not satisfy the condition that K=3 in a reference subframe at a channel sensing period setting point in time n+10 for an uplink channel sensing operation 650 of the terminal, in Method 2-2. The reference subframe in Method 2-2 is uplink subframes 620, 622, and 624. As another example, if it is assumed that K=3 (even when the base station determines at 666 in a subframe n+9 a transmission result of an uplink data channel 626 transmitted by the terminal in a subframe n+7) the base station determines the latest uplink subframe 624 satisfying the condition that K=3 as a reference subframe for an uplink channel sensing operation 650 of the terminal, in Method 2-3.

The base station may set a size of a contention window for determining an uplink channel sensing period by at least one of Methods 2-1, 2-2, and 2-3. The base station may use a plurality of contention windows corresponding to respective terminals for each terminal, or may use one contention window capable of being applied to all terminals. The base station may use a plurality of contention windows depending on a quality of service (QoS) or LBT class, or may apply a contention window set to be different for each QoS or LBT class to all terminals.

When the base station uses one contention window capable of being applied to all terminals (or cell-specific contention window), the base station may set a size of a contention window for an uplink channel sensing operation according to the determination result by at least one of Methods 2-1, 2-2, and 2-3. When the base station uses a plurality of contention windows depending on a QoS or LBT class (or cell-specific contention window per LBT class), the base station may set a plurality of contention windows together according to the determination result by at least one of Methods 2-1, 2-2, and 2-3. For example, when it is determined by the base station using a contention window 1 for LBT class 1 and a contention window 2 for LBT class 2 that the contention window needs to be changed by at least one of Methods 2-1, 2-2, and 2-3, both the contention window and the contention window 2 may be increased or initialized together. In a case in which the base station uses a plurality of contention windows depending on LBT class, the base station may select an LBT class corresponding to the uplink transmission period, select a random variable (or backoff counter) within a contention window for the selected LBT class, and set the selected variable as the selected channel sensing period value (or selected variable value) for the terminal requiring an uplink channel sensing operation.

The randomly selected channel sensing period value may be commonly applied to all cases requiring an uplink channel sensing operation in the uplink transmission period. For example, in order to perform a channel sensing operation for an LBT class in the uplink transmission period 658 in FIG. 6, the base station may select a random variable within a contention window for the selected LBT class, and set the selected channel sensing period value for the terminal configuring uplink transmission in a period 658 so that the selected channel sensing period value is commonly used for uplink channel sensing operations 650, 652, 654, and 656. In other words, the base station may set one channel sensing period value for one uplink transmission period, and use the set channel sensing period value for all uplink channel sensing operations within the uplink transmission period.

The base station may set and use a channel sensing period value for each uplink channel sensing operations within the uplink transmission period. The channel sensing period may be selected within a contention window for the selected LBT class. In other words, different channel sensing period values may be selected within one contention period and applied to uplink channel sensing periods 650, 652, 654, and 656.

When the base station uses a plurality of contention windows corresponding to respective terminals for each terminal (or UE-specific contention window), the base station may set contention windows of terminals performing uplink signal transmission in an uplink transmission period 638 in FIG. 6 including a reference subframe of Method 2-1, 2-2, or 2-3 according to an uplink transmission result of the terminal determined by at least one of Methods 2-1, 2-2, and 2-3. In other words, contention windows of terminals that did not perform uplink signal transmission in the uplink transmission period 638 including a reference subframe of Method 2-1, 2-2, or 2-3 maintains previously set contention windows without being changed. The base station may also set contention windows of all terminals regardless of whether the uplink signal transmission is performed in an uplink transmission period 638 including a reference subframe of Method 2-1, 2-2, or 2-3 according to a result determined by at least one of Methods 2-1, 2-2, and 2-3.

In the case in which the base station uses a plurality of contention windows corresponding to respective terminals for each terminal, a channel sensing period required for an uplink channel sensing operation may be set by using contention windows of the terminals that are set so that the uplink channel sensing operations are performed at the same point in time.

Referring again to FIG. 6, for example, the base station may select a random variable (or backoff counter) based on a largest contention window of contention windows of terminals configuring uplink transmission 640 in a subframe n+14, and set a channel sensing period value (or selected variable value) required for the uplink channel sensing operation 650 for the terminals configuring the uplink transmission 640 in the subframe n+14 using the selected variable. Alternatively, the base station may select a random variable (or backoff counter) within respective contention windows of terminals configuring uplink transmission 640 in a subframe n+14, and may select a largest channel sensing period or backoff counter of the selected variables as a channel sensing period value required for the uplink channel sensing operation 650 to set the channel sensing period value required for the uplink channel sensing operation 650 for the terminals configuring the uplink transmission 640 in the subframe n+14.

The base station may set the selected channel sensing period for the terminal through a downlink control channel. The selected channel sensing period value (or backoff counter) may be set for the terminal by being included in control information (DCI) for the uplink data channel or uplink control signal transmission configuration of the terminal. A field corresponding to a channel sensing period value may be set to DCI format 0, 4 or a new DCI format in addition to variables associated with uplink transmission and transmitted to the terminal requiring uplink transmission setting. At this point, the selected channel sensing period value may also be transmitted to all terminal by using a common search space of a downlink control channel.

Unlike Method 2, the base station transmits a result of uplink signal transmission of the terminal for each terminal, the terminal sets a contention window based on the uplink signal transmission result, and a channel sensing period for a channel sensing operation for uplink transmission set using the set contention window may be set. In other words, when it is set in uplink signal setting information of the terminal transmitted by the base station through a downlink control channel that a base station reception result for previous uplink signal transmission is NACK, the terminal may increase the contention window. When it is set in uplink signal setting information of the terminal transmitted by the base station through a downlink control channel that a base station reception result for previous uplink signal transmission is ACK, the terminal may initialize the contention window.

When it is determined that a base station reception result for previous uplink transmission is NACK regardless of hybrid automatic repeat request (HARQ) process for the uplink transmission, the terminal may increase the contention window and select a channel sensing period value within the increased contention window. The terminal may divide and use the contention window for each HARQ process for the uplink transmission. If the set uplink transmission is set as an HARQ process that is different from an HARQ process for previous uplink transmission, the terminal may select a channel sensing period using a contention window corresponding to the set HARQ process regardless of the base station reception result for the previous uplink transmission. When a base station reception result for previous uplink transmission is NACK, a contention window for the previous uplink transmission is increased. In a case in which the terminal divides and uses a contention window for each uplink HARQ process, the terminal may also select a channel sensing period value based on a largest contention window of contention windows of the set HARQ process.

Figure 7:
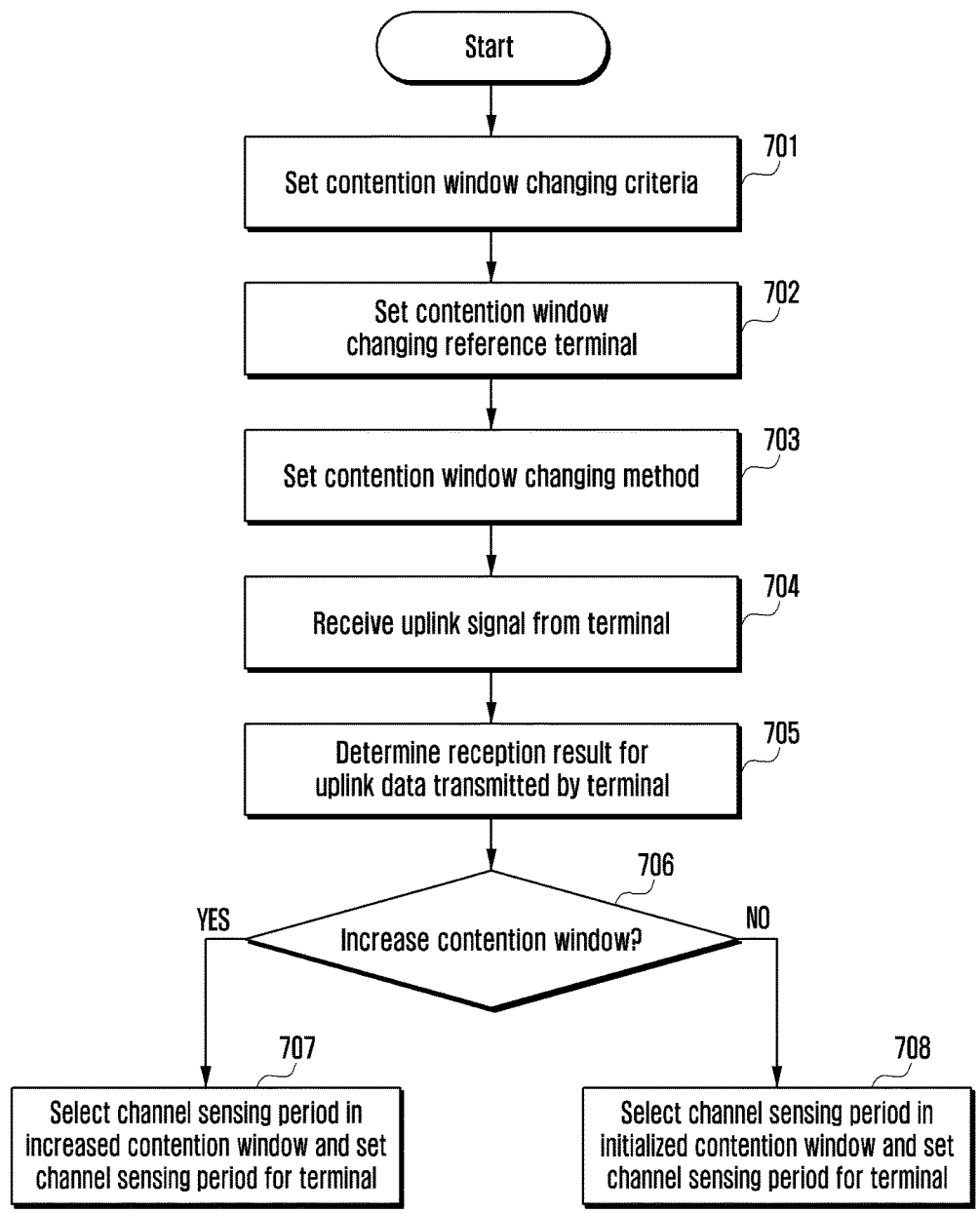
FIG. 7 is a flowchart of a method for setting a contention window in a base station for a channel sensing operation, according to an embodiment of the present disclosure.

FIG. 7 is a flowchart of a method for setting a contention window in a base station for a channel sensing operation, according to an embodiment of the present disclosure.

In step 701, contention window setting criteria is set. The entire uplink transmission period of the terminal or a part of the uplink transmission period of the terminal among uplink transmission periods before setting a channel sensing period for an uplink channel sensing operation may be set as a reference subframe for setting a contention window. The base station may use a reception result of uplink transmission of the terminal in the reference subframe that is determined before setting the channel sensing period for the uplink channel sensing operation.

In step 702, a contention window setting reference terminal is set. A terminal performing transmission in the entire or some subframes of the uplink transmission period may be set as a reference terminal.

In step 703, a contention window changing method is set. That is, the contention window may be changed using a ratio of NACK of an uplink signal reception result determined according to the steps 701 and 702.

In step 704, the base station receives an uplink signal from the terminal. In step 705, a reception result of the uplink signal of the terminal received in step 704 is determined. In step 706, a contention window is set by determining the uplink reception result of the terminal that is determined in step 705 based on the contention window changing criteria set in steps 701, 702 and 703.

If it is determined in step 706 that the contention window needs to be increased, the base station increases the contention window, sets a channel sensing period for an uplink channel sensing operation within the increased contention window, and sets the selected channel sensing period for the terminal by including the channel sensing period in uplink transmission setting information in step 707. If it is determined in step 706 that the contention window does not need to be increased, the base station initializes the contention window, sets a channel sensing period for an uplink channel sensing operation within the initialized contention window, and sets the selected channel sensing period for the terminal by including the channel sensing period in uplink transmission setting information in step 708.

Figure 8:
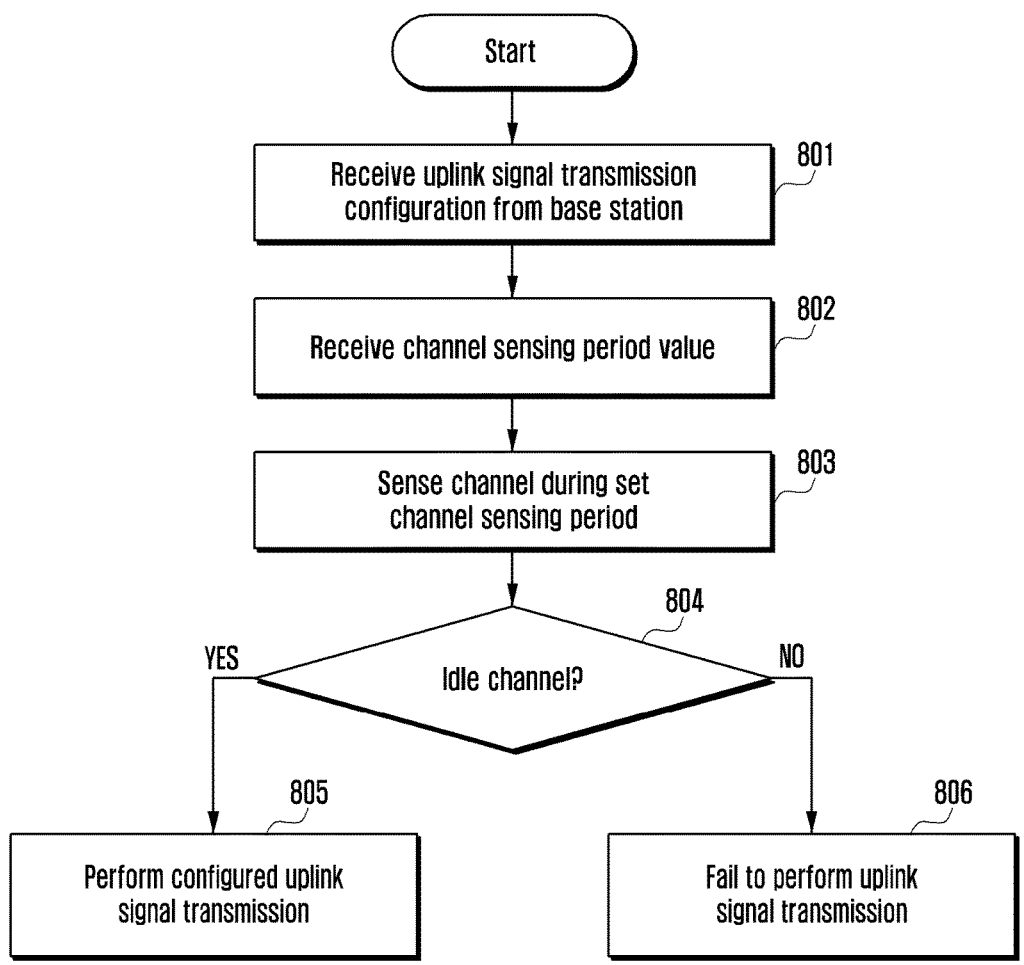
FIG. 8 is a flowchart of a method for setting a contention window in a terminal for a channel sensing operation, according to an embodiment of the present disclosure.

FIG. 8 is a flowchart of a method for setting a contention window in a UE for a channel sensing operation, according to an embodiment of the present disclosure.

In step 801, the terminal receives configuration information for uplink signal transmission from the base station. A channel sensing period may be included in the uplink signal transmission setting information. The terminal receiving the channel sensing period from the base station in step 802 senses a channel during the channel sensing period before uplink signal transmission set in step 803.

If it is determined in step 804 that the channel sensed in step 803 is in an idle state, the terminal performs the set uplink signal transmission in step 805. If it is determined in step 804 that the channel sensed in step 803 is being occupied by other devices, the terminal does not perform the uplink signal transmission in step 806.

Figure 9:
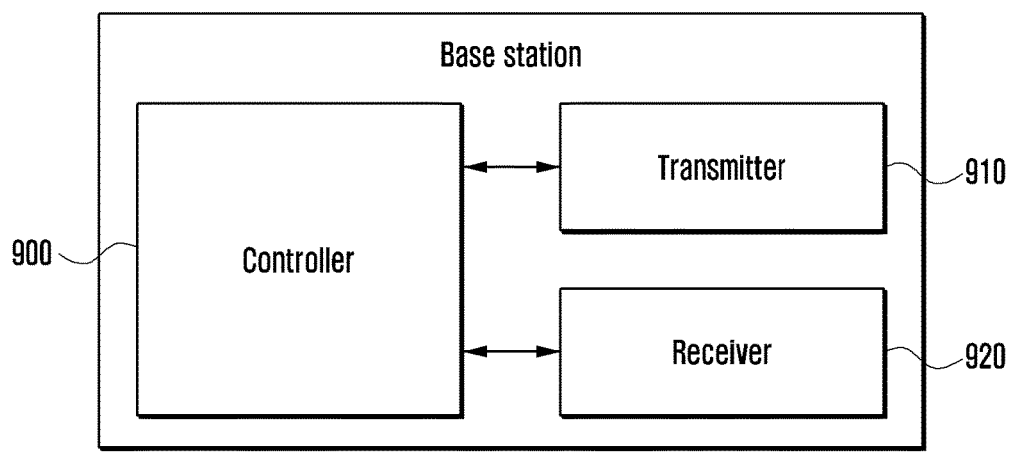
FIG. 9 is a diagram of a base station apparatus, according to an embodiment of the present disclosure.

FIG. 9 is a diagram illustrating a base station apparatus for setting a contention window and a channel sensing period of the terminal by the base station using an unlicensed band, according to an embodiment of the present disclosure.

A receiver 920 of the base station may perform an operation for sensing an unlicensed band channel using a set value for a channel sensing operation set through a controller 900 of the base station, as well as a function of receiving a signal from the base station or the terminal, or measuring a channel from the base station or the terminal. Further, the controller 900 of the base station may determine a reception result of the signal received from the terminal through the receiver 920 of the base station, set a contention window required for a channel sensing operation of the terminal according to the determination result, and set a channel sensing period value of the terminal by selecting a random variable within the set contention window. Further, the controller 900 of the base station may transmit a control signal configuring uplink signal transmission of the terminal through a downlink control channel by including the set channel sensing period value of the terminal in a transmitter 910 of the base station.

Figure 10:
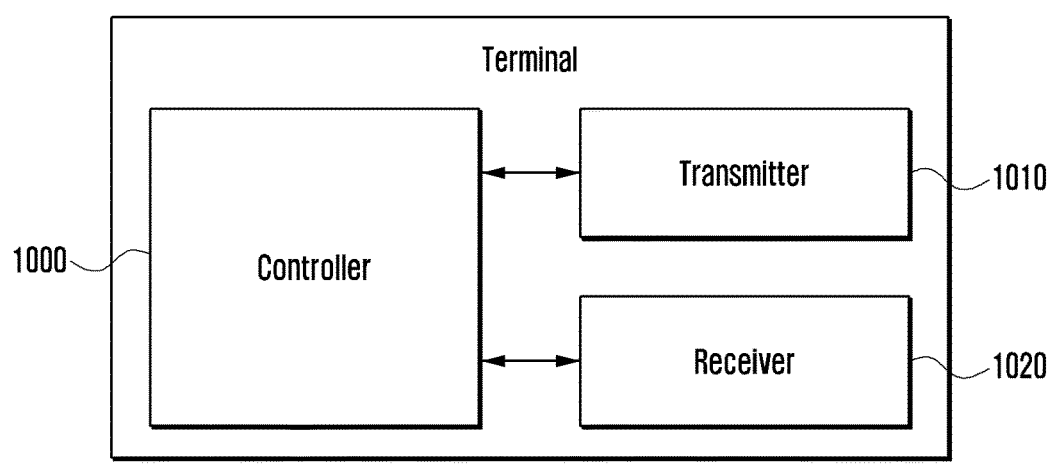
FIG. 10 is a diagram illustrating of a terminal apparatus, according to an embodiments of the present disclosure.

FIG. 10 is a diagram illustrating a terminal apparatus using an unlicensed band, according to an embodiment of the present disclosure.

A controller 100 of the terminal in FIG. 10 may set a channel sensing operation so that the terminal performs the channel sensing operation during a channel sensing period required for uplink signal transmission in an unlicensed band that is set by the base station using a receiver 1020. Further, the controller 1000 may configure uplink transmission in time and frequency resources set according to uplink signal transmission set by the base station and received through the receiver 1020.

The receiver 1020 senses a channel during the channel sensing period set by the controller 1000, and when it is determined by the controller 1000 that the channel is in an idle state based on intensity of a signal received by the receiver during the channel sensing period, a transmitter 1010 may configure uplink transmission in time and frequency resources set according to the uplink signal transmission set by the base station.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. A method for transmitting an uplink signal by a user equipment (UE) in a wireless communication system, the method comprising:
   receiving, from a base station, information on a channel sensing type indicating a first channel sensing type to perform a channel sensing operation using a variable time period or a second channel sensing type to perform the channel sensing operation using the fixed time period;
   sensing a channel for an unlicensed band based on the information on the channel sensing type; and
   transmitting, to the base station, the uplink signal in the unlicensed band after sensing the channel for the unlicensed band,
   wherein the variable time period is randomly selected based on a contention window for the UE, and
   wherein a value of the contention window is determined based on a new data indicator (NDI) value for a hybrid automatic repeat request (HARQ) process.

2. The method of claim 1, wherein the uplink signal is transmitted after sensing the channel for the unlicensed band during the variable time period if the first channel sensing type is applied to the UE.

3. The method of claim 1, wherein the uplink signal is transmitted after sensing the channel for the unlicensed band during the fixed time period if the second channel sensing type is applied to the UE.

4. A method for receiving an uplink signal by a base station in wireless communication system, the method comprising:
   generating information on a channel sensing type indicating a first channel sensing type to perform a channel sensing operation using a variable time period or a second channel sensing type to perform the channel sensing operation using a fixed time period;
   transmitting, to a user equipment (UE), the information on the channel sensing type; and
   receiving, from the UE, the uplink signal in an unlicensed band after the UE senses a channel for the unlicensed band based on the information on the channel sensing type,
   wherein the variable time period is randomly selected based on a contention window for the UE, and
   wherein a value of the contention window is determined based on a new data indicator (NDI) value for a hybrid automatic repeat request (HARQ) process.

5. The method of claim 4, wherein the uplink signal is received after the UE senses the channel for the unlicensed band during the variable time period if the first channel sensing type is applied to the UE.

6. The method of claim 4, wherein the uplink signal is received after the UE senses the channel for the unlicensed band during the fixed time period if the second channel sensing type is applied to the UE.

7. A user equipment (UE) for transmitting an uplink signal in wireless communication system, the UE comprising:
   a transceiver; and
   a controller coupled with the transceiver and configured to control to:
      receive, from a base station, through the transceiver, information on a channel sensing type indicating a first channel sensing type to perform a channel sensing operation using a variable time period or a second channel sensing type to perform the channel sensing operation using a fixed time period,
      sense a channel for an unlicensed band based on the information on the channel sensing type, and
      transmit, to the base station, through the transceiver, the uplink signal in the unlicensed band after sensing the channel for the unlicensed band,
   wherein the variable time period is randomly selected based on a contention window for the UE, and
   wherein a value of the contention window is determined based on a new data indicator (NDI) value for a hybrid automatic repeat request (HARQ) process.

8. The UE of claim 7, wherein the uplink signal is transmitted after sensing the channel for the unlicensed band during the variable time period if the first channel sensing type is applied to the UE; or
   wherein the uplink signal is transmitted after sensing the channel for the unlicensed band during the fixed time period if the second channel sensing type is applied to the UE.

9. A base station for receiving an uplink signal in wireless communication system, the base station comprising:
   a transceiver; and
   a controller coupled with the transceiver and configured to control to:
      generate information on a channel sensing type indicating a first channel sensing type to perform a channel sensing operation using a variable time period or a second channel sensing type to perform the channel sensing operation using a fixed time period,
      transmit, to a user equipment (UE), through the transceiver, the information on the channel sensing type, and
      receive, from the UE, through the transceiver, the uplink signal in an unlicensed band after the UE senses a channel for the unlicensed band based on the information on the channel sensing type,
   wherein the variable time period is randomly selected based on a contention window for the UE, and
   wherein a value of the contention window is determined based on a new data indicator (NDI) value for a hybrid automatic repeat request (HARQ) process.

10. The base station of claim 9, wherein the uplink signal is transmitted after sensing the channel for the unlicensed band during the variable time period if the first channel sensing type is applied to the UE.

11. The base station of claim 9, wherein the uplink signal is transmitted after sensing the channel for the unlicensed band during the fixed time period if the second channel sensing type is applied to the UE.

* * * * *